US012704380B2

(12) United States Patent
Liu et al.

(10) Patent No.: US 12,704,380 B2
(45) Date of Patent: Aug. 11, 2026

(54) NAVIGATION METHOD, ELECTRONIC DEVICE, AND COMPUTER-READABLE STORAGE MEDIUM

(71) Applicant: GUANGDONG COROS SPORTS TECHNOLOGY CO., LTD, Dongguan (CN)

(72) Inventors: Jingguang Liu, Dongguan (CN); Haotian Niu, Dongguan (CN); Yu Tang, Dongguan (CN)

(73) Assignee: GUANGDONG COROS SPORTS TECHNOLOGY CO., LTD, Dongguan (CN)

( * ) Notice: Subject to any disclaimer, the term of this patent is extended or adjusted under 35 U.S.C. 154(b) by 92 days.

(21) Appl. No.: 18/767,344

(22) Filed: Jul. 9, 2024

(65) Prior Publication Data

US 2026/0016304 A1 Jan. 15, 2026

(51) Int. Cl.
*G01C 21/34* (2006.01)

(52) U.S. Cl.
CPC ................................ *G01C 21/3446* (2013.01)

(58) Field of Classification Search
None
See application file for complete search history.

(56) References Cited

U.S. PATENT DOCUMENTS

2005/0043884 A1* 2/2005 Atarashi ............ G01C 21/3415 340/995.19
2013/0131986 A1* 5/2013 Van Seggelen ........... G06F 8/70 701/533
2016/0245663 A1* 8/2016 van Dok ............ G01C 21/3676
2019/0033092 A1* 1/2019 Yang ...................... G01C 21/34
2019/0204099 A1* 7/2019 Buck, Jr. ................. G06F 1/163
2021/0381847 A1* 12/2021 Cajias .................. G09B 29/106

* cited by examiner

*Primary Examiner* — Ryan Rink
(74) *Attorney, Agent, or Firm* — ANOVA LAW GROUP, PLLC

(57) ABSTRACT

A navigation method includes obtaining an initial navigation route, receiving a route erasing operation, and erasing a target section according to the route erasing operation. The target section includes at least a part of the initial navigation route corresponding to the route erasing operation. The method further includes determining a target navigation route according to the initial navigation route and the target section, and controlling an electronic device to perform navigation according to the target navigation route.

20 Claims, 13 Drawing Sheets

NAVIGATION METHOD, ELECTRONIC DEVICE, AND COMPUTER-READABLE STORAGE MEDIUM

TECHNICAL FIELD

The present disclosure generally relates to the field of terminal technologies and, more particularly, to a navigation method, an electronic device, and a storage medium.

BACKGROUND

As electronic devices become more popular, navigation has become an important part of people's daily life. People can reach many unfamiliar places through navigation, which greatly facilitates people's daily travel. A current navigation method generally includes: a user entering a starting point and an end point in an electronic device; the electronic device planning one or more navigation routes in a map according to the starting point, the end point, and road information; and the user selecting one navigation route from the one or more navigation routes for route navigation. In the current navigation method, the user can only navigate according to a complete navigation route planned by the electronic device. Because of incompleteness of information collection or untimely update, one or more sections of this navigation route may not be the optimal sections or the sections that the user wants. The current navigation method cannot flexibly adjust some sections of the navigation route, resulting in the final navigation route not being the navigation route that the user actually wants, which greatly reduces the user experience.

SUMMARY

In accordance with the present disclosure, there is provided a navigation method including obtaining an initial navigation route, receiving a route erasing operation, and erasing a target section according to the route erasing operation. The target section includes at least a part of the initial navigation route corresponding to the route erasing operation. The method further includes determining a target navigation route according to the initial navigation route and the target section, and controlling an electronic device to perform navigation according to the target navigation route.

Also in accordance with the present disclosure, there is provided an electronic device including at least one memory storing at least one computer program, and at least one processor configured to execute the at least one computer program to obtain an initial navigation route, receive a route erasing operation, and erase a target section according to the route erasing operation. The target section includes at least a part of the initial navigation route corresponding to the route erasing operation. The at least one processor is further configured to execute the at least one computer program to determine a target navigation route according to the initial navigation route and the target section, and control the electronic device to perform navigation according to the target navigation route.

Also in accordance with the present disclosure, there is provided a non-transitory computer readable storage medium storing at least one computer program that, when executed by at least one processor, causes the at least one processor to obtain an initial navigation route, receive a route erasing operation, and erase a target section according to the route erasing operation. The target section includes at least a part of the initial navigation route corresponding to the route erasing operation. The at least one computer program further causes the at least one processor to determine a target navigation route according to the initial navigation route and the target section, and control an electronic device to perform navigation according to the target navigation route.

DETAILED DESCRIPTION OF THE EMBODIMENTS

Figure 1:
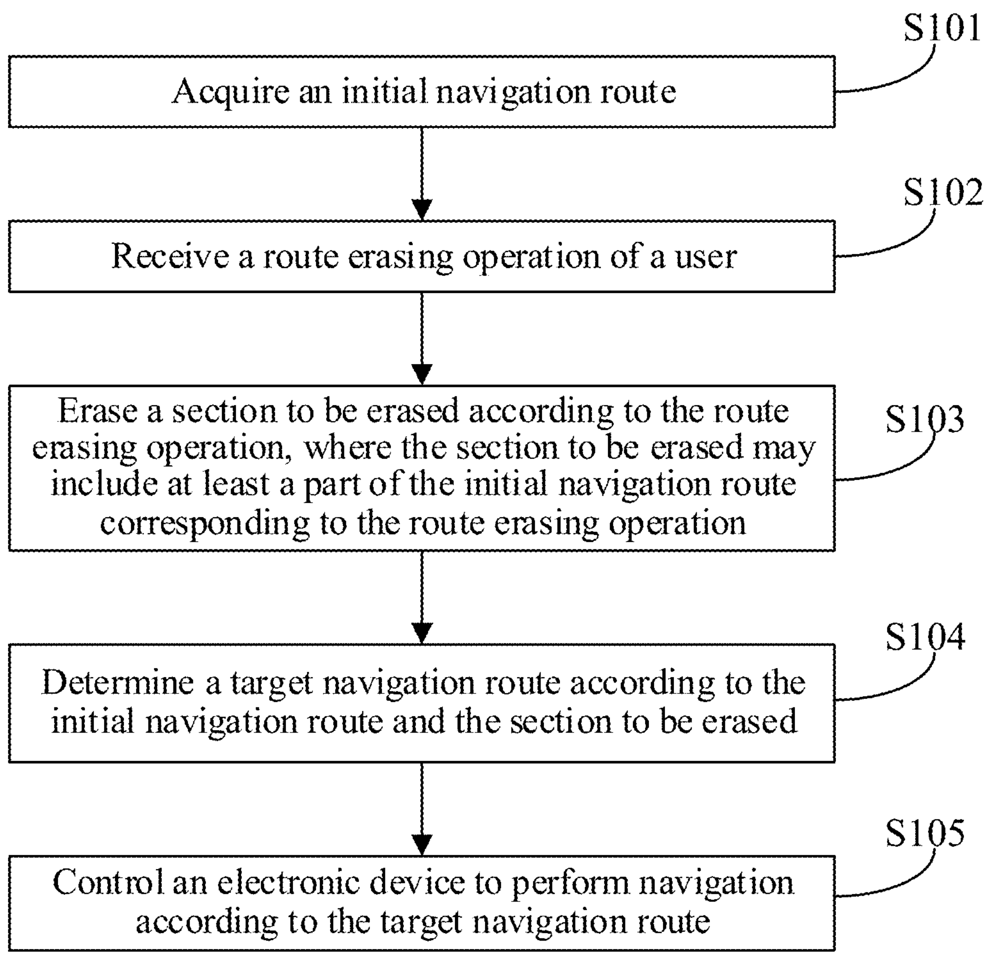
FIG. 1 is a flow chart of a navigation method consistent with the present disclosure.

When used in the specification and the claims in the present disclosure, the term "including" indicates the presence of the described features, wholes, steps, operations, elements and/or components, but does not exclude the presence or addition of one or more other features, wholes, steps, operations, elements, components and/or their collections.

The term "and/or" used in the specification and the claims in the present disclosure refers to any combination of one or more of the items listed in association and all possible combinations, and includes these combinations.

As used in the specification and the claims in the present disclosure, the term "if" can be interpreted as "when . . . " or "once" or "in response to determination" or "in response to detection" according to the context. Similarly, the phrase "if it is determined" or "if [the described condition or event] is detected" can be interpreted as meaning "once it is determined" or "in response to determination" or "once [the described condition or event] is detected" or "in response to detection of [the described condition or event]" according to the context.

In addition, in the specification and the claims in the present disclosure, the terms "first," "second," "third," etc. are only used to distinguish the description, and cannot be understood as indicating or implying relative importance.

References to "one embodiment" or "some embodiments" etc. described in the specification of the present disclosure mean that one or more embodiments of the present disclosure include specific features, structures or characteristics described in conjunction with the embodiments. Therefore, the phrases "in one embodiment," "in some embodiments," "in some other embodiments," etc., that appear in different places in this specification do not necessarily refer to the same embodiment, but mean "one or more but not all embodiments," unless otherwise specifically emphasized in other ways. The terms "including," "comprising," "having" and their variations all mean "including but not limited to," unless otherwise specifically emphasized in other ways. "Multiple" or "plurality of" means "two or more."

Specific embodiments of the present disclosure are hereinafter described with reference to the accompanying drawings. The described embodiments are merely examples of the present disclosure and do not limit the scope of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure. The present disclosure may also be implemented in other embodiments without these specific details. In other cases, detailed descriptions of well-known systems, devices, circuits, and methods are omitted so as not to obscure the description of the present disclosure with unnecessary details.

The steps involved in the navigation method provided in the embodiments of the present disclosure are only examples. Not all steps must be executed, neither is all information or messages required. They can be included or omitted as needed during use. The same step or steps or messages with the same function in the embodiments of the present disclosure can be referenced to by each other in different embodiments.

The application scenarios described in the embodiments of the present disclosure are used to more clearly illustrate the technical solution of the embodiments of the present disclosure, and do not constitute a limitation on the technical solution provided in the embodiments of the present disclosure. It is known to those of ordinary skill in the art that with the evolution of network architecture and the emergence of new application scenarios, the technical solution provided in the embodiments of the present disclosure is also applicable to similar technical problems.

As electronic devices become more popular, navigation has become an important part of people's daily life. People can reach many unfamiliar places through navigation, which greatly facilitates people's daily travel. A current navigation method generally includes: a user entering a starting point and an end point in an electronic device, the electronic device planning one or more navigation routes in a map according to the starting point, the end point, and road information, and the user selecting one navigation route from the one or more navigation routes for route navigation. In the current navigation method, the user can only navigate according to a complete navigation route planned by the electronic device. Because of the incompleteness of information collection or the untimely update, one or more sections of this navigation route may not be the optimal section or the section that the user wants. The current navigation method cannot flexibly adjust some sections of the navigation route, resulting in the final navigation route not being the navigation route that the user actually wants, which greatly reduces the user experience.

The present disclosure provides a navigation method, an electronic device, and a computer readable storage medium, to at least partially alleviate the above problem. In the navigation method provided by the present disclosure, when navigation is needed, the electronic device may obtain an initial navigation route and receive a route erasing operation of a user, to erase a section to be erased according to the route erasing operation. The section to be erased may include at least a part of the initial navigation route corresponding to the route erasing operation. Subsequently, the electronic device may determine a target navigation route according to the initial navigation route and the section to be erased, such that the electronic device navigates according to the target navigation route. In the present disclosure, the electronic device may erase a part of sections in the initial navigation route according to the route erasing operation of the user, and determine the target navigation route according to the initial navigation route and the erased part of the sections, such that the electronic device navigates according to the target navigation route. That is, the user may be able to flexibly adjust part of the sections in the initial navigation route through the route erasing operation, such that the final target navigation route meets the user's needs and improves the user experience.

In various embodiments of the present disclosure, the electronic device may be a mobile phone, a tablet computer, a wearable device, a vehicle-mounted device, a notebook computer, an ultra-mobile personal computer (UMPC), a netbook, a personal digital assistant (PDA), a desktop computer, etc., which is able to be installed with a navigation application for navigation. The present disclosure does not limit the specific type of the electronic device.

The present disclosure provides a navigation method. In one embodiment, as shown in FIG. 1 which is a flow chart of an exemplary navigation method provided by the present disclosure, the navigation method includes:

S101: obtaining an initial navigation route;

S102: receiving a route erasing operation of a user;

S103: erasing a section to be erased (also referred to as a "target section") according to the route erasing operation, where the section to be erased includes at least a part of the initial navigation route corresponding to the route erasing operation;

S104: determining a target navigation route according to the initial navigation route and the section to be erased; and S105: controlling an electronic device to navigate according to the target navigation route.

In one embodiment, the initial navigation route may be determined by the electronic device based on a starting point and an end point input by the user. That is, when the user needs to navigate through the electronic device, for example, when the user needs to use the electronic device for running navigation, cycling navigation, or driving navigation, the user may start the navigation application in the electronic device and enter the starting point and the end point of the initial navigation route in the navigation application. After the electronic device obtains the starting point and end point input by the user, the electronic device may determine one or more candidate navigation routes based on the starting point and the end point, as well as the road information, and display the one or more candidate navigation routes in the navigation application. The user may select one candidate navigation route from the one or more candidate navigation routes. The electronic device may determine the candidate navigation route selected by the user as the initial navigation route.

The present disclosure does not limit the way in which the user inputs the starting point and the end point of the initial navigation route, which may be specifically determined according to the actual scenario. For example, in some embodiments, the user may input the starting point and the end point of the initial navigation route by voice, or by text, or by clicking on position points in the navigation interface, and so on.

The present disclosure does not limit the specific way in which the electronic device determines the one or more candidate navigation routes based on the starting point, the end point, and road information, which may be specifically determined according to the actual scenario. For example, in some embodiments, the one or more candidate navigation routes may be determined according to any existing determination methods.

In another example, the initial navigation route may also be drawn by the user. That is, when the user needs to navigate through the electronic device, the user may start the navigation application in the electronic device, and may draw the initial navigation route in the navigation application to obtain the initial navigation route.

Figure 2:
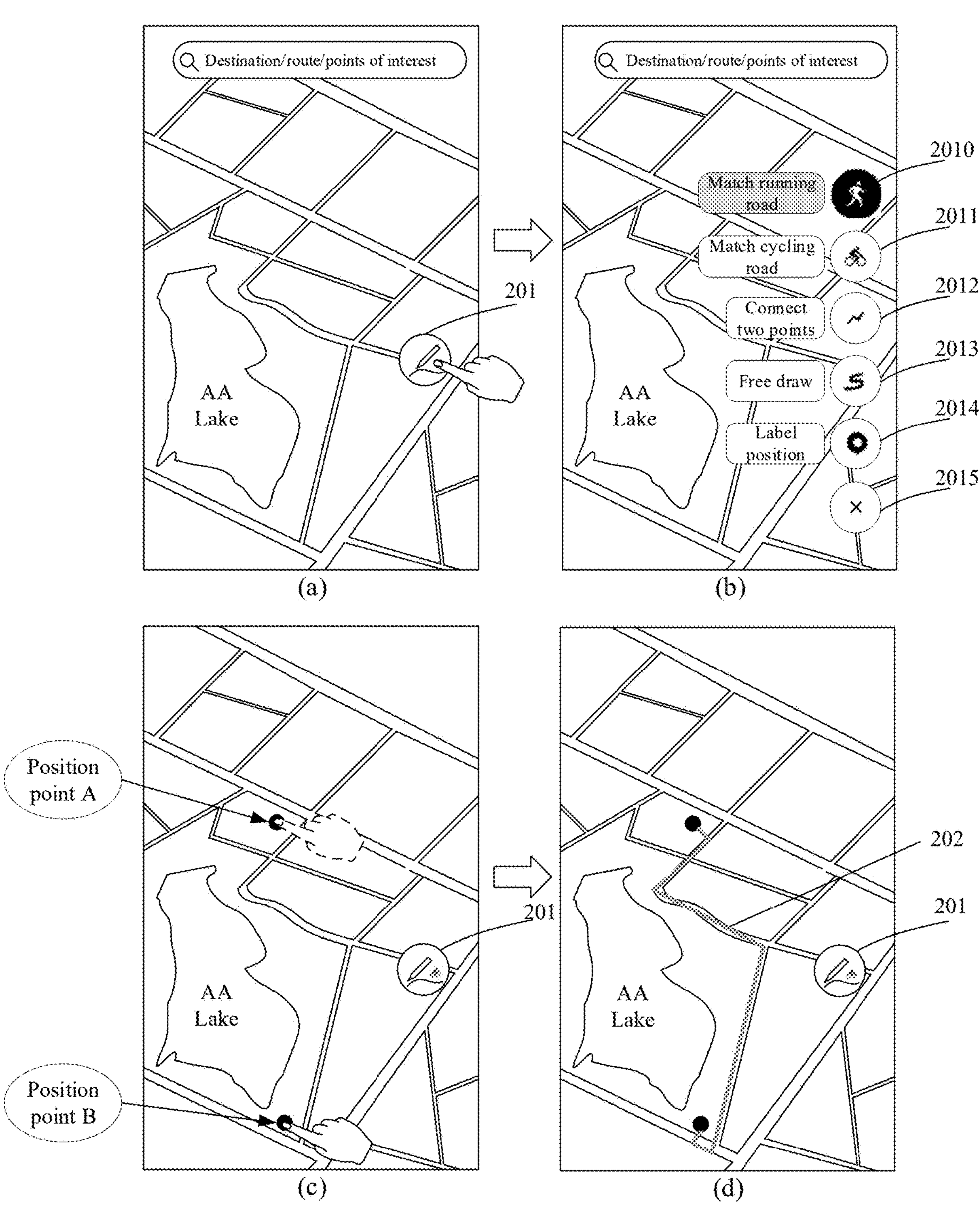
FIG. 2 and FIG. 3 are schematic diagrams showing application scenarios for obtaining an initial navigation route consistent with the present disclosure.
Figure 3:
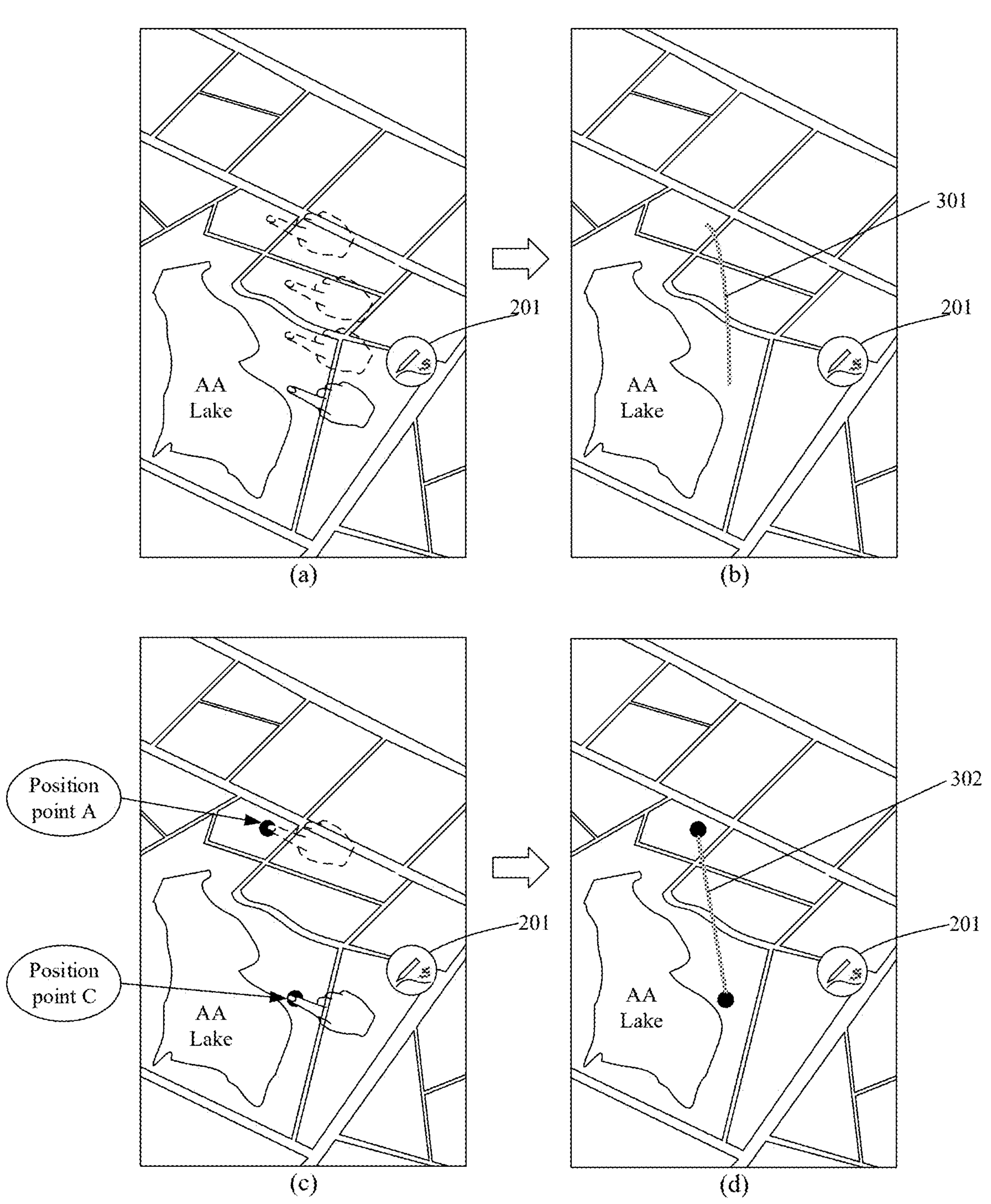

A process of drawing the initial navigation route by the user will be described in detail below. FIG. 2 and FIG. 3 are schematic diagrams showing application scenarios for obtaining the initial navigation route provided in one embodiment of the present disclosure. These application scenarios in the present embodiment is exemplified by taking running navigation or cycling navigation as an example.

In one embodiment, when navigation through the electronic device is needed, the user may start the navigation application in the electronic device, for example, the user may click on an icon corresponding to the navigation application in the electronic device to start the navigation application. As shown in part (2) of FIG. 2, when a click operation on the icon corresponding to the navigation application is detected, the electronic device may open the navigation application, and may display the map interface corresponding to the navigation application in the display interface of the electronic device. The map interface may include map information of the user's current position and a route drawing menu 201. Further, a search box may also be displayed in the map interface, such that the user is able to find destinations, routes or points of interest, etc. through the search box.

As shown in part (a) of FIG. 2, when the user needs to draw a navigation route, the user may click on the route drawing menu 201 in the map interface. When the electronic device detects the click operation on the route drawing menu 201, one or more drawing buttons included in the route drawing menu 201 may be displayed in the map interface. For example, the route drawing menu 201 may include a "match running road" button 2010, a "match cycling road" 2011, a "connect two points" button 2012, and a "free draw" button 2013. That is, as shown in FIG. 2, the map interface may display a "match running road" button 2010, a "match cycling road" 2011, a "connect two points" button 2012, a "free draw" button 2013, and a "label position" button 2014. The user may draw the initial navigation route according to the drawing buttons displayed in the map interface. In some embodiments, after opening the route drawing menu 201, the electronic device may select the "match running road" method by default to draw the navigation route.

In one example, when the user wishes to draw the initial navigation route by "matching running road" or "matching cycling roads," the user may click the "matching running roads" button 2010 or "matching cycling roads" 2011 in the map interface, for example, may click "matching cycling roads" 2011. Subsequently, the user may enter the starting point and the end point of the initial navigation route. For example, as shown in part (c) of FIG. 2, the user may enter the starting point and the end point of the initial navigation route by clicking on position point A and position point B in the map interface. At this time, the map interface may display a route drawing menu 201, and the route drawing menu 201 may include the identification of the matching cycling road. After the electronic device obtains the starting point and the end point input by the user, it may determine one or more candidate navigation routes for running or cycling according to the starting point, the end point and the road information, and display the determined one or more candidate navigation routes in the map interface. For example, as shown in part (d) of FIG. 2, the electronic device may determine candidate navigation routes according to the starting point, the end point and the road information (a candidate navigation route 202 is used as an example in part (d) of FIG. 2). The user may select a route based on the candidate navigation routes displayed in the map interface. The electronic device may determine the candidate navigation route selected by the user as the initial navigation route and display the initial navigation route in the map interface.

The present disclosure does not specifically limit the way in which the user inputs the starting point and the end point of the initial navigation route. For example, in one embodiment, the user may input the starting point and the end point of the initial navigation route by clicking on the position points (such as position point A and position point B) in the map interface. After the electronic device detects the click operation on position point A and position point B, it may determine the starting point and the end point of the initial navigation route according to position point A and position point B. For example, the electronic device may determine position point A which is clicked first as the starting point of the initial navigation route, and may determine position point B which is clicked secondly as the end point of the initial navigation route. In one embodiment, the second click operation may be performed multiple times, and the electronic device may determine the position point corresponding to the second click operation performed for the first or last time as the end point of the initial navigation route.

In another embodiment, after the user clicks on position point A, the electronic device may display the position details of position point A in the map interface, and also display a "Set as starting point" button and a "Set as destination" button. In some embodiments, the electronic device may also display a "Save position" button in the map interface. When the user wishes to set position point A as the starting point, the user may click the "Set as starting point" button in the map interface. Therefore, the electronic device may determine position point A as the starting point of the initial navigation route. Subsequently, the user may continue to click on position point B. Similarly, the electronic device may display the position details of position point B in the map interface, and display the "Set as starting point" button, the "Set as destination" button, and the "Save position" button. When the user wishes to set position point B as the end point, the user may click the "Set as destination" button. Therefore, the electronic device may determine position point B as the end point of the initial navigation route.

The present disclosure dose not specifically limit the specific manner in which the electronic device determines the candidate navigation routes based on the starting point, the end point, and the road information, which may be determined specifically based on the actual scenario.

In another embodiment, when the user wishes to freely draw the initial navigation route, the user may click the "free draw" button 2013 in the map interface. Subsequently, the user may freely draw the navigation route in the map interface, that is, the user may perform the initial navigation route drawing operation in the map interface. After the electronic device detects the initial navigation route drawing operation, the initial navigation route may be determined according to the initial navigation route drawing operation.

In some embodiments, the initial navigation route drawing operation may be a sliding operation. That is, as shown in part (a) of FIG. 3, after clicking the "free draw" button 2013 in the map interface, the user may perform the sliding operation in the map interface. At this time, the route drawing menu 201 may be displayed in the map interface, and the route drawing menu 201 may include a free drawing logo. As shown in part (b) of FIG. 3, after the electronic device detects the sliding operation, the map trajectory 301 corresponding to the sliding operation may be determined in the map interface, and the map trajectory 301 corresponding to the sliding operation may be determined as the initial navigation route.

In another embodiment, when the user wishes to draw the initial navigation route by "connecting two points," the user may click the "connect two points" button 2012. Subsequently, the user may enter at least two position points corresponding to the initial navigation route. At this time, the map interface may also display the route drawing menu 201, and the route drawing menu 201 may include the mark of the two-point connection. After the electronic device obtains the at least two position points input by the user, it may connect any two adjacent position points in a straight line in the map interface to obtain the route corresponding to the at least two position points, and may determine the route corresponding to the at least two position points as the initial navigation route. For example, as shown in part (c) of FIG. 3, the user may enter the at least two positions by clicking on position point A and position point C in the map interface. As shown in part (d) of FIG. 3, after detecting the click operation on position point A and position point C, the electronic device may connect position point A and position point C in a straight line in the map interface to obtain the route 302 corresponding to position point A and position point C, and may determine the route 302 corresponding to position point A and position point C as the initial navigation route.

The present disclosure has no limit on the manner in which the user inputs the at least two position points, which may be specifically determined according to the actual scenario.

For example, the user may input the at least two position points by clicking on the position points in the map interface. When inputting the at least two position points by clicking on the position points, the time when the electronic device connects any two adjacent position points in a straight line may be during the process of the user inputting the position points, or may also be after the user completes the input of all position points.

For example, after clicking the "connect two points" button 2012, the user may click on position point A in the map interface. After the electronic device detects the click operation on position point A, the position A may be determined as the starting point of the initial navigation route. Subsequently, the user may click on position point B in the map interface again. After the electronic device detects the click operation on position point B, position point A and position point B may be connected by a straight line to obtain the route 202 corresponding to position point A-position point B. At this time, if the user still needs to add position points, the user may continue to click on position point C in the map interface. After the electronic device detects the click operation on position point C, position point B and position point C may be connected by a straight line to obtain the route corresponding to position point A-position B-position point C. Assuming that the user does not add any more position points subsequently, the electronic device may determine the route corresponding to position point A-position point B-position point C as the initial navigation route.

For example, after clicking the "connect two points" button 2012, if the user determines the initial navigation route through position point A, position point B, and position point C in the map interface, the user may click position point A, position point B, and position point C in the map interface in sequence. After the electronic device detects the sequential click operations on position point A, position point B, and position point C, it may connect position point A and position point B through a straight line, and may connect position point B and position point C through a straight line, to obtain a route corresponding to position point A-position point B-position point C. Subsequently, the electronic device may determine the route corresponding to position point A-position point B-position point C as the initial navigation route.

In one embodiment, as shown in part (b) of FIG. 2, the route drawing menu 201 may further include a "label position" button 2014. When the user wishes to mark a position in a navigation application, the user may click the "label position" button 2014 and may click (e.g., single-click, etc.) the position point (e.g., position point A) that the user wishes to mark in the map interface. When the electronic device detects a click operation on position point A, position point A may be saved. In another embodiment, when the electronic device detects a click operation on position point A, the position details information of position point A may be displayed in the map interface, and a "save position" button may be displayed, such that the user may determine whether position point A needs to be saved based on the position details information of position point A. When position point A needs to be saved, the user may click the "save position" button to save position point A. Subsequently, the user may input position points such as the starting point or the end point through the saved position points. For example, the user may click on the saved position point A. When the electronic device detects the click operation on the saved position point A, the position detail information of position point A may be displayed in the map interface, and a "Set as starting point" button and a "Set as destination" button may be displayed, such that the user is able to input the position point by clicking on the saved position point.

In some embodiments, as shown in part (b) of FIG. 2, the route drawing menu 201 may further include a close button 2015, and the close button may be configured to close the drawing buttons displayed in the route drawing menu 201. That is, when the user wishes to close the "match running road" button 2010, "match cycling road" 2011, "connect two points" button 2012, "free draw" button 2013, and "label position" button 2014 displayed in the map interface, the user may click the close button 2015. When the electronic device detects the click operation on the close button 2015, it may close the drawing buttons displayed in the route drawing menu 201, such that the map interface returns to the display state shown in part (a) of FIG. 2.

S102 for receiving the user's route erasing operation and S103 for erasing the section to be erased according to the route erasing operation will be described below in detail.

In one embodiment, after the initial navigation route is obtained, if the user wishes to modify the initial navigation route, the user may perform the route erasing operation. After the electronic device receives the user's route erasing operation, it may determine the section to be erased in the initial navigation route according to the route erasing operation, and erase the section to be erased from the initial navigation route, thereby modifying the initial navigation route.

For example, after obtaining the initial navigation route, the electronic device may display the initial navigation route in the map interface, and may display an erase button in the map interface. When the user wishes to modify the initial navigation route, the user may click the erase button to trigger the route erasing function of the electronic device. Subsequently, the user may perform the route erasing operation. When the electronic device detects that the erase button is clicked, it may determine that the user needs to erase part of the section in the initial navigation route. At this time, the electronic device may detect the route erasing operation in the map interface. After detecting the route erasing operation, the electronic device may determine the section to be erased in the initial navigation route according to the route erasing operation, and may erase the section to be erased from the initial navigation route.

The present disclosure has no limit on the route erasing operation, which may be specifically determined according to the actual application scenario. For example, the route erasing operation may be determined as a sliding operation according to the actual application scenario. That is, when the user wishes to modify the initial navigation route, the user may perform a sliding operation in the map interface. The electronic device may determine the section to be erased in the initial navigation route according to the sliding operation detected in the map interface, and may erase the section to be erased from the initial navigation route In some embodiments, in one embodiment, after the electronic device obtains the route erasing operation performed by the user, it may determine a map area corresponding to the route erasing operation according to the route erasing operation, and determine the section to be erased according to at least a part of the initial navigation route covered in the map area. For example, when the route erasing operation is a sliding operation and the electronic device detects the sliding operation in the map interface, the electronic device may determine the map area corresponding to the sliding operation in the map interface, and determine one or more parts of the initial navigation route covered by the map area. Subsequently, the electronic device may determine the section to be erased according to the one or more parts of the initial navigation route covered by the map area.

A part of the initial navigation route may refer to a continuous section of the initial navigation route. That is, part A and part B described below may refer to a section of the initial navigation route respectively. For example, part A may be a section A of the initial navigation route, and part B may be a section B of the initial navigation route.

When there is only one part of the initial navigation route covered by the map area, for example, when there is only part A of the initial navigation route covered by the map area, the electronic device may directly determine part A of the initial navigation route as the section to be erased. In some other embodiments, when there are multiple parts of the initial navigation route covered by the map area, that is, when it is detected that the map area covers multiple parts of the initial navigation route, the electronic device may determine the section to be erased from the multiple parts according to the route erasing operation.

In one example, the electronic device may obtain the distance between each of the multiple parts and the starting point of the initial navigation route, and may determine a first target part which is closest to the starting point of the initial navigation route according to the distance. Subsequently, the electronic device may determine the first target part of the initial navigation route as the section to be erased. In another embodiment, the electronic device may obtain the distance between each of the multiple parts and the end point of the initial navigation route, and may determine a second target part which is closest to the end point of the initial navigation route based on the distance. Subsequently, the electronic device may determine the second target part in the initial navigation route as the section to be erased.

Figure 4:
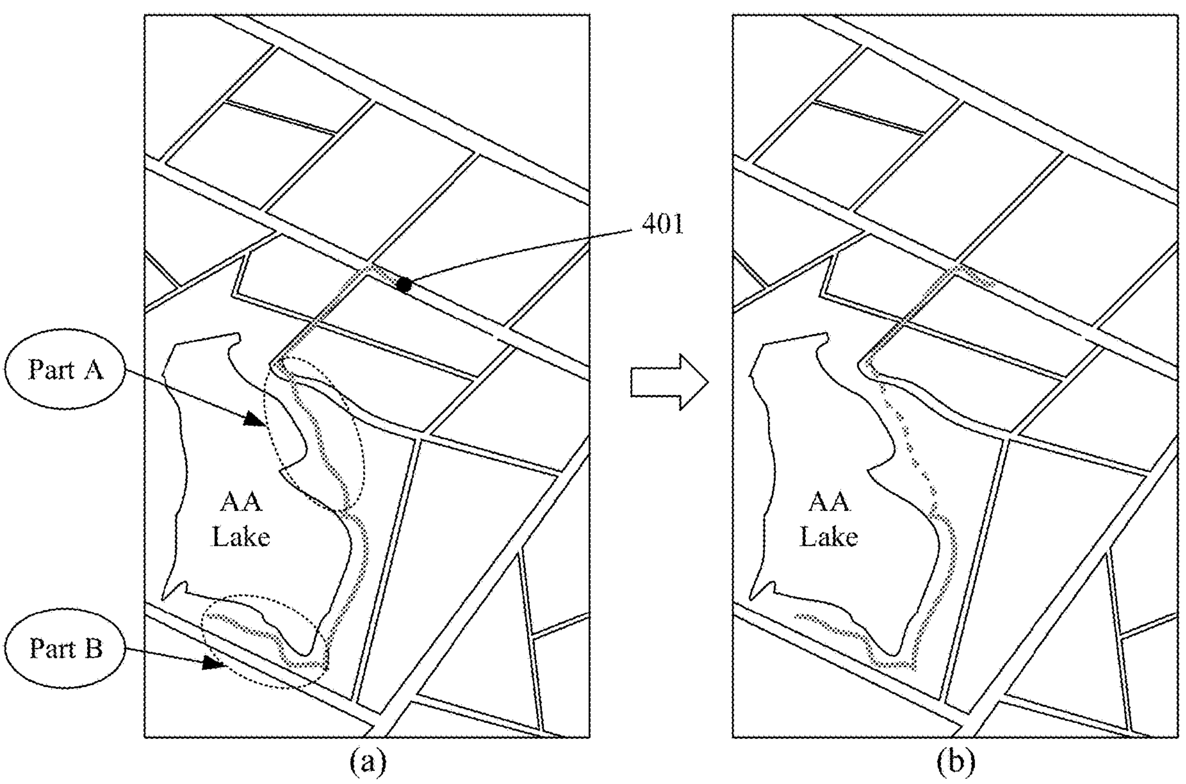
FIG. 4 is a schematic diagram showing an application scenario for determining a section to be erased consistent with the present disclosure.

FIG. 4 is a schematic diagram showing an application scenario for determining the section to be erased provided by one embodiment of the present disclosure. This application scenario is exemplified by taking the section to be erased being a portion closer to the starting point of the initial navigation route as an example.

As shown in part (a) of FIG. 4, when it is detected that the map area covers part A and part B in the initial navigation route, the electronic device may obtain the distance A between part A and the starting point 401 of the initial navigation route, and obtain the distance B between part B and the starting point 401 of the initial navigation route. At this time, the electronic device may determine that the distance A is less than the distance B. Therefore, as shown in part (b) of FIG. 4, the electronic device may determine part A in the initial navigation route as the section to be erased.

In one embodiment, the distance between a certain part of the initial navigation route and the starting point or the end point of the initial navigation route may refer to the route distance between the center point of the part and the starting point or the end point of the initial navigation route. That is, the distance between the part and the starting point/end point of the initial navigation route may refer to the distance from the center point of the part to the starting point/end point of the initial navigation route when moving along the initial navigation route. In some other embodiments, the distance between a certain part of the initial navigation route and the starting point/end point of the initial navigation route may also refer to the straight-line distance between the center point of the part and the starting point/end point of the initial navigation route. That is, the distance between the part and the starting point/end point of the initial navigation route may refer to the distance of the straight line formed between the center point of the portion and the starting point/end point of the initial navigation route.

The center point of the part may refer to the middle position point of the section corresponding to the part on the route. That is, the route distances between the center point of the part and the two endpoints of the part may be the same. For example, when the part includes endpoint A and endpoint B, route distance A between the center point of the part and endpoint A may be the same as route distance B between the center point of the part and endpoint B.

In another embodiment, when the route erasing operation is a sliding operation, the electronic device may obtain the time when each of the multiple parts is covered by the map area corresponding to the route erasing operation, and may determine a third target part that is covered by the map area earliest according to the time. Subsequently, the electronic device may determine the third target part in the initial navigation route as the section to be erased. In another embodiment, the electronic device may determine a fourth target part that is covered by the map area latest according to the time, and then may determine the fourth target part in the initial navigation route as the section to be erased.

Figure 5:
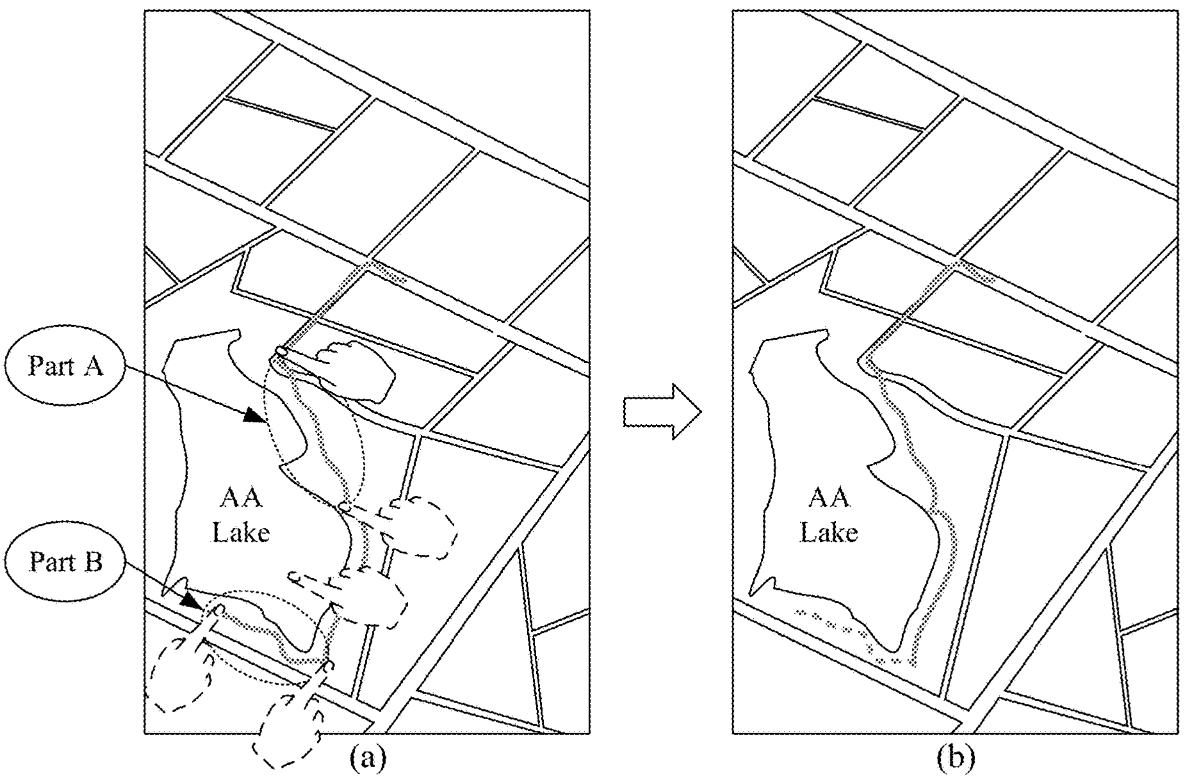
FIG. 5 is another schematic diagram showing an application scenario for determining a section to be erased consistent with the present disclosure.

FIG. 5 is a schematic diagram showing another application scenario for determining the section to be erased provided by one embodiment of the present disclosure. This application scenario is exemplified by taking the section to be erased being a part of the initial navigation route that is covered by the map area earliest as an example.

As shown in part (a) of FIG. 5, when it is detected that the map area covers part A and part B in the initial navigation route, and it is detected that the sliding operation corresponding to the map area is sliding from part B to part A, that is, when the sliding operation performed by the user in the map interface is sliding from the dotted line gesture to the solid line gesture as shown in part (a) of FIG. 5, the electronic device may determine that the time when part B is covered by the map area is earlier than the time when part A is covered by the map area. Therefore, as shown in part (b) of FIG. 5, the electronic device may determine part B in the initial navigation route as the section to be erased.

When the initial navigation route includes multiple parts covered by the map area, the above embodiments where the electronic device described above determines the section to be erased according to the distance between each part and the starting point/end point of the initial navigation route, are used as examples, to illustrate the present disclosure, and do not limit the scope of the present disclosure. For example, in some other embodiments, the electronic device may also determine the section to be erased according to the distance between each part and other position points such as the center point of the initial navigation route, and so on. Similarly, the above embodiments with the above-mentioned determination of the section to be erased according to the early/late time when each part is covered by the map area is only an exemplary explanation and should not be understood as a limitation on the embodiments of the present application. For example, in some other embodiments, the electronic device may also determine the section to be erased based on the part covered by the map area at an intermediate moment, or may determine the section to be erased based on the second or third part covered by the map area, and so on.

In another embodiment, when the initial navigation route includes a round trip section, and the map area covers the round trip section in the initial navigation route, the electronic device may determine the section to be erased according to the initial section of the round trip section, or may determine the section to be erased according to the tail section of the round trip section. In some embodiments, the electronic device may determine the initial section of the round trip section as the section to be erased, or may determine the tail section of the round trip section as the section to be erased. The initial section of the round trip route may be a section closer to the starting point of the initial navigation route, and the tail section of the round trip section may be a section farther from the starting point of the initial navigation route. That is, the distance between the initial section of the round trip section and the starting point of the initial navigation route is less than the distance between the tail section of the round trip section and the starting point of the initial navigation route.

The distance between the initial section or the tail section of the round trip section and the starting point of the initial navigation route may be the route distance. Specifically, the distance between a certain part of the initial navigation route and the starting point/end point of the initial navigation route may be referred to the relevant description of the route distance, which will not be repeated here.

Figure 6:
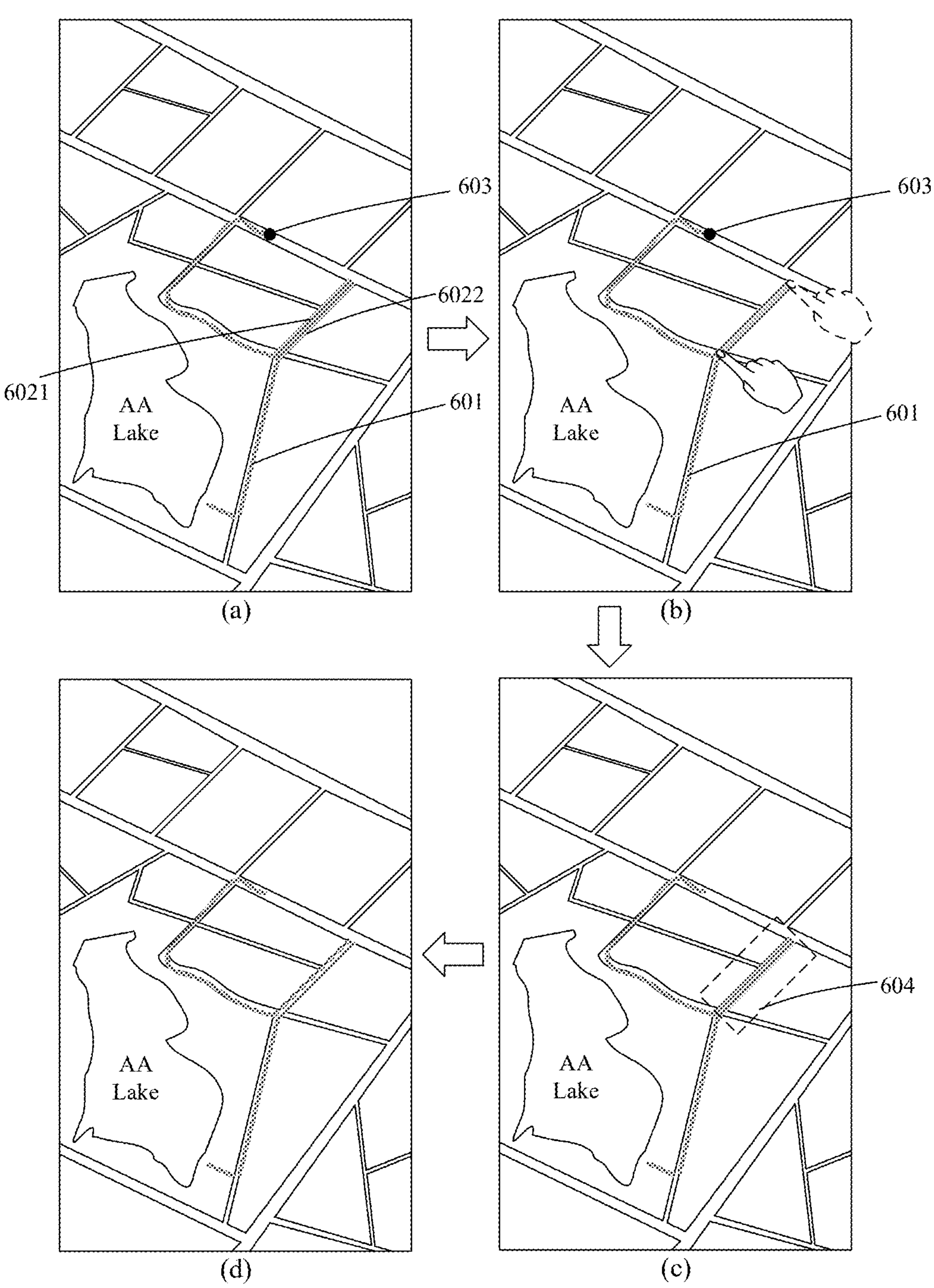
FIG. 6 is another schematic diagram showing an application scenario for determining a section to be erased consistent with the present disclosure.

FIG. 6 is a schematic diagram showing an application scenario for determining the section to be erased provided by another embodiment of the present disclosure. This application scenario is exemplified by taking the determination of the section to be erased according to the initial section of the round-trip section as an example.

As shown in part (a) of FIG. 6, the electronic device may display the initial navigation route 601 in the map interface, the initial navigation route 601 includes the round-trip section, and the round-trip section includes an initial section 6021 and a tail section 6022. The distance between the initial section 6021 of the round-trip section and the starting point 603 of the initial navigation route 601 may be less than the distance between the tail section 6022 of the round-trip section and the starting point 603 of the initial navigation route 601. When the user performs a sliding operation as shown in part (b) of FIG. 6 in the map interface, the electronic device may determine that the map area 604 corresponding to the sliding operation is as shown part (c) of FIG. 6, that is, the electronic device may determine that the map area 604 corresponding to the sliding operation includes the round-trip section in the initial navigation route 601. At this time, as shown in part (d) of FIG. 6, the electronic device may determine the initial section 6021 of the round-trip section as the section to be erased. In another possible embodiment, when the initial navigation route includes multiple parts covered by the map area, the electronic device may determine the section to be erased according to the user's selection operation. For example, when it is detected that the map area covers multiple parts of the initial navigation route, the electronic device may pop up a prompt message in the map interface to prompt the user to select the part to be erased through the prompt message. That is, the user may select the part to be erased according to the prompt message. The electronic device may determine the part selected by the user as the section to be erased.

For example, when the map area covers part A and part B of the initial navigation route, the electronic device may pop up a prompt window in the map interface, and the prompt window may display a prompt message of "Please select the part to be erased'. Further, the prompt window may also display a selection button corresponding to "Part A," a selection button corresponding to "Part B," a selection button corresponding to "Part A and Part B," and a selection button corresponding to "None." When the user wishes to erase part A, the user may click the selection button corresponding to "Part A," and the electronic device may determine part A as the section to be erased. When the user wishes to erase part B, the user may click the selection button corresponding to "Part B," and the electronic device then may determine part B as the section to be erased. When the user wishes to erase part A and part B, the user may click the selection button corresponding to "Part A and Part B," and the electronic device then may determine part A and part B as the section to be erased. When the user does not wish to erase either part A or part B, the user may click the selection button corresponding to "None," and the electronic device then may determine that there is no section to be erased.

In some embodiments, after determining the section to be erased, to facilitate the user to clearly know which section of the initial navigation route is the section to be erased, the electronic device may indicate the section to be erased by a dotted line.

For example, after determining the section to be erased according to the route erasing operation, the electronic device may determine the two endpoints corresponding to the section to be erased (hereinafter referred to as the first endpoint and the second endpoint). Among them, the first endpoint may be an endpoint close to the starting point of the initial navigation route, and the second endpoint may be an endpoint far from the starting point of the initial navigation route. That is, the distance between the first endpoint and the starting point of the initial navigation route may be less than the distance between the second endpoint and the starting point of the initial navigation route. The distance between the first endpoint/the second endpoint and the starting point of the initial navigation route may be a route distance or a straight-line distance. In the present embodiment, the route distance will be taken as an example for exemplary description. The specific content when the distance is a straight-line distance is similar to the content when the distance is a route distance. The specific content may refer to the specific description when the distance is a route distance, which will not be repeated here.

In one embodiment, after determining the first endpoint and the second endpoint of the section to be erased, the electronic device may display the first endpoint and the second endpoint of the section to be erased in the map interface. At this time, the user may move the first endpoint and/or the second endpoint in the map interface to adjust the section to be erased. The electronic device may determine the adjusted section to be erased based on the moved first endpoint and/or the moved second endpoint. For example, when the user moves the first endpoint to adjust the section to be erased, the electronic device may determine the section to be erased based on the moved first endpoint, the unmoved second endpoint, and the initial navigation route, that is, the section between the moved first endpoint and the unmoved second endpoint in the initial navigation route may be determined as the section to be erased. For another example, when the user moves the second endpoint to adjust the section to be erased, the electronic device may determine the section to be erased based on the unmoved first endpoint, the moved second endpoint, and the initial navigation route, that is, the section between the unmoved first endpoint and the moved second endpoint in the initial navigation route may be determined as the section to be erased. For another example, when the user moves the first endpoint and the second endpoint to adjust the section to be erased, the electronic device may determine the section to be erased based on the moved first endpoint, the moved second endpoint and the initial navigation route, that is, the section in the initial navigation route between the moved first endpoint and the moved second endpoint may be determined as the section to be erased.

In one embodiment, after determining the section to be erased, the electronic device may display a confirmation button in the map interface indicating whether to erase the section to be erased, such that the user is able to confirm again whether the section to be erased needs to be erased. For example, after determining the section to be erased, the electronic device may display a confirmation button and a cancel button corresponding to the section to be erased in the map interface. Therefore, when the user determines that the section to be erased needs to be erased, the user may click the confirmation button, at which point the electronic device determines that the section to be erased needs to be erased and erases the section to be erased from the initial navigation route. When the user does not wish to erase the section to be erased, the user may click the cancel button, at which point the electronic device will not erase the section to be erased from the initial navigation route.

Figure 7:
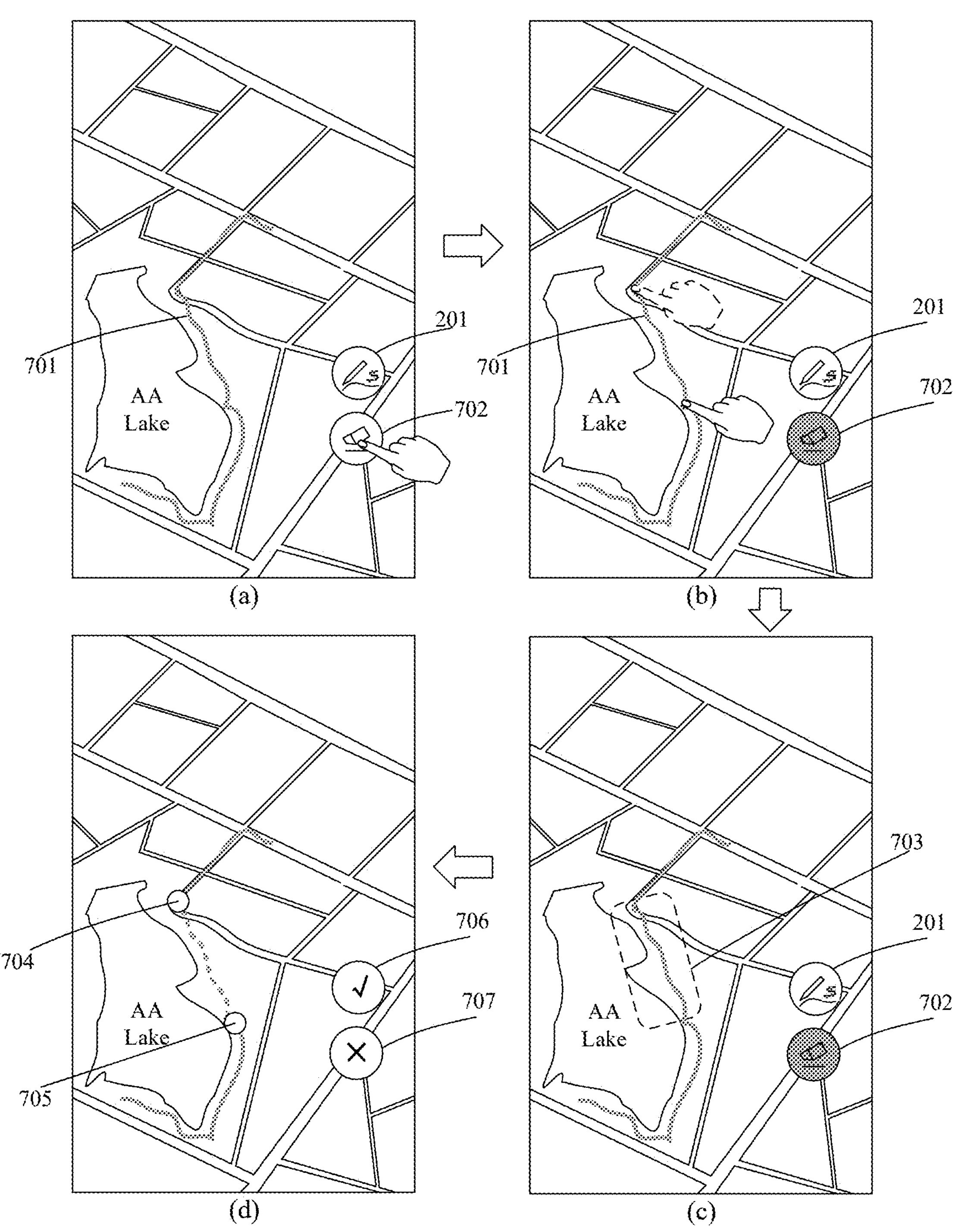
FIG. 7 and FIG. 8 are schematic diagrams showing application scenarios for erasing a section to be erased consistent with the present disclosure.
Figure 8:
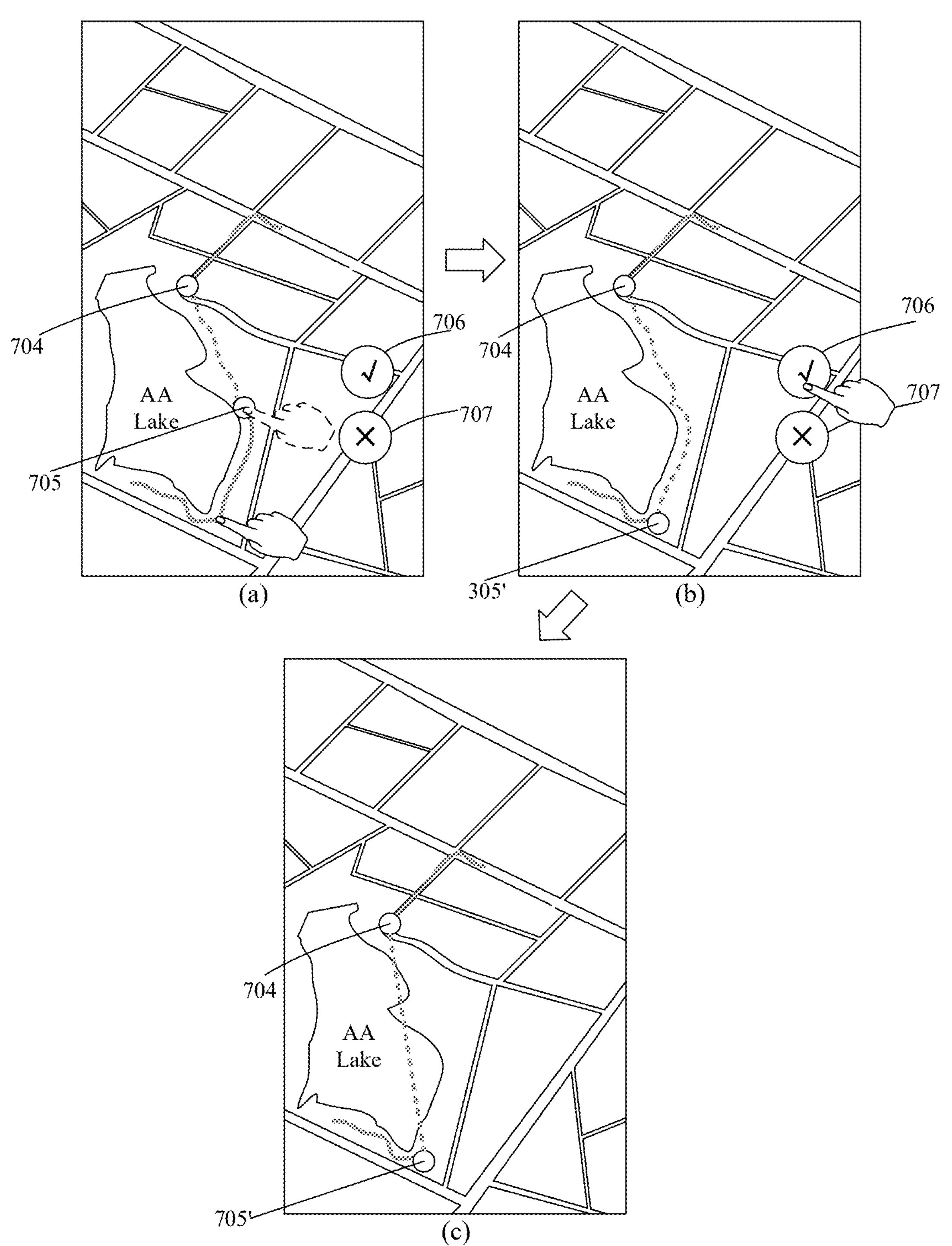

FIG. 7 and FIG. 8 are schematic diagrams showing an application scenario of erasing a section to be erased.

As shown in part (a) of FIG. 7, after determining the initial navigation route 701 according to the free drawing method, the electronic device may display the initial navigation route 701 in the map interface. Further, the electronic device may display an erase button 702 and a route drawing menu 201 in the map interface, where the route drawing menu 201 may include a free drawing logo. As shown in part (a) of FIG. 7, when the user wishes to adjust the initial navigation route 701, the user may click the erase button 372 in the map interface, and may perform the route erasing operation in the map interface. For example, as shown in part (b) of FIG. 7, the user may perform the sliding operation on the section to be erased in the map interface.

As shown in part (c) of FIG. 7, after the electronic device detects the sliding operation in the map interface, it may determine the map area 703 corresponding to the sliding operation according to the sliding operation, and may determine the part of the initial navigation route covered by the map area 703 according to the map area 703. Subsequently, the electronic device may determine the section to be erased, and the first endpoint 704 and the second endpoint 705 of the section to be erased according to the portion of the initial navigation route covered by the map area 703, and display the section to be erased, and the first endpoint 704 and the second endpoint 705 of the section to be erased in the map interface. In some embodiments, the electronic device may represent the section to be erased by a dotted line. For example, the electronic device may display the section to be erased as shown in part (d) of FIG. 7 in the map interface, and the first endpoint 704 and the second endpoint 705 of the section to be erased. Further, as shown in part (d) of FIG. 7, the electronic device may also display a confirmation button 706 and a cancel button 707 corresponding to the section to be erased in the map interface.

When the user wishes to adjust the section to be erased, the user may move the first endpoint 704 and/or the second endpoint 705. For example, as shown in part (a) of FIG. 8, the user may move the second endpoint 705 to adjust the section to be erased. At this time, the electronic device may determine the adjusted section to be erased based on the first endpoint 704 and the second endpoint 705' after being moved, and may display the adjusted section to be erased, as well as the first endpoint 704 and the second endpoint 705' of the adjusted section to be erased in the map interface, for example, displaying the adjusted section to be erased as shown in part (b) of FIG. 7, as well as the first endpoint 704 and the second endpoint 705' of the adjusted section to be erased.

As shown in part (b) of FIG. 8, after the adjustment of the section to be erased is completed, if the user determines that the section to be erased needs to be erased, the user may click the confirmation button 706. After the electronic device detects the click operation on the confirmation button 706, the section to be erased may be erased from the initial navigation route. In some embodiments, as shown in part (c) of FIG. 8, after erasing the section to be erased, the electronic device may connect the first endpoint 704 and the second endpoint 705' of the section to be erased by a dotted line to obtain the initial navigation route after erasing the section to be erased.

S104 for determining the target navigation route according to the initial navigation route and the section to be erased and S105 for controlling the electronic device to navigate according to the target navigation route will be described in detail below.

In one embodiment, the electronic device may directly determine the initial navigation route after erasing the section to be erased as the target navigation route, and may control the electronic device to navigate according to the target navigation route. That is, the electronic device may determine the starting point of the initial navigation route as the starting point of the target navigation route, and may determine the end point of the initial navigation route as the end point of the target navigation route.

In one example, when the section to be erased includes the starting point of the initial navigation route, the electronic device may determine the second end point of the section to be erased as the starting point of the initial navigation route, to determine the target navigation route according to the starting point and end point of the initial navigation route. That is, when the section to be erased is a section including the starting point in the initial navigation route, the electronic device may directly determine the unerased section in the initial navigation route as the target navigation route, and may control the electronic device to perform route navigation according to the target navigation route.

In another example, when the section to be erased includes the end point of the initial navigation route, the electronic device may determine the first end point of the section to be erased as the end point of the initial navigation route, to determine the target navigation route according to the starting point and the end point of the initial navigation route. That is, when the section to be erased is a section in the initial navigation route that includes the end point, the electronic device may directly determine the unerased section in the initial navigation route as the target navigation route, and may control the electronic device to perform route navigation according to the target navigation route.

In another example, when the section to be erased includes neither the starting point nor the end point of the initial navigation route, the electronic device may determine the unerased section in the initial navigation route, and the dotted route formed between the first end point and the second end point of the section to be erased as the target navigation route, and may perform segmented navigation according to the target navigation route.

When performing segmented navigation according to the target navigation route, the electronic device may obtain the user's position and perform segmented navigation according to the user's position and the target navigation route. That is, the electronic device may determine the user's position on the target navigation route according to the user's position and may perform segmented navigation according to the user's position on the target navigation route and the target navigation route.

Figure 9:
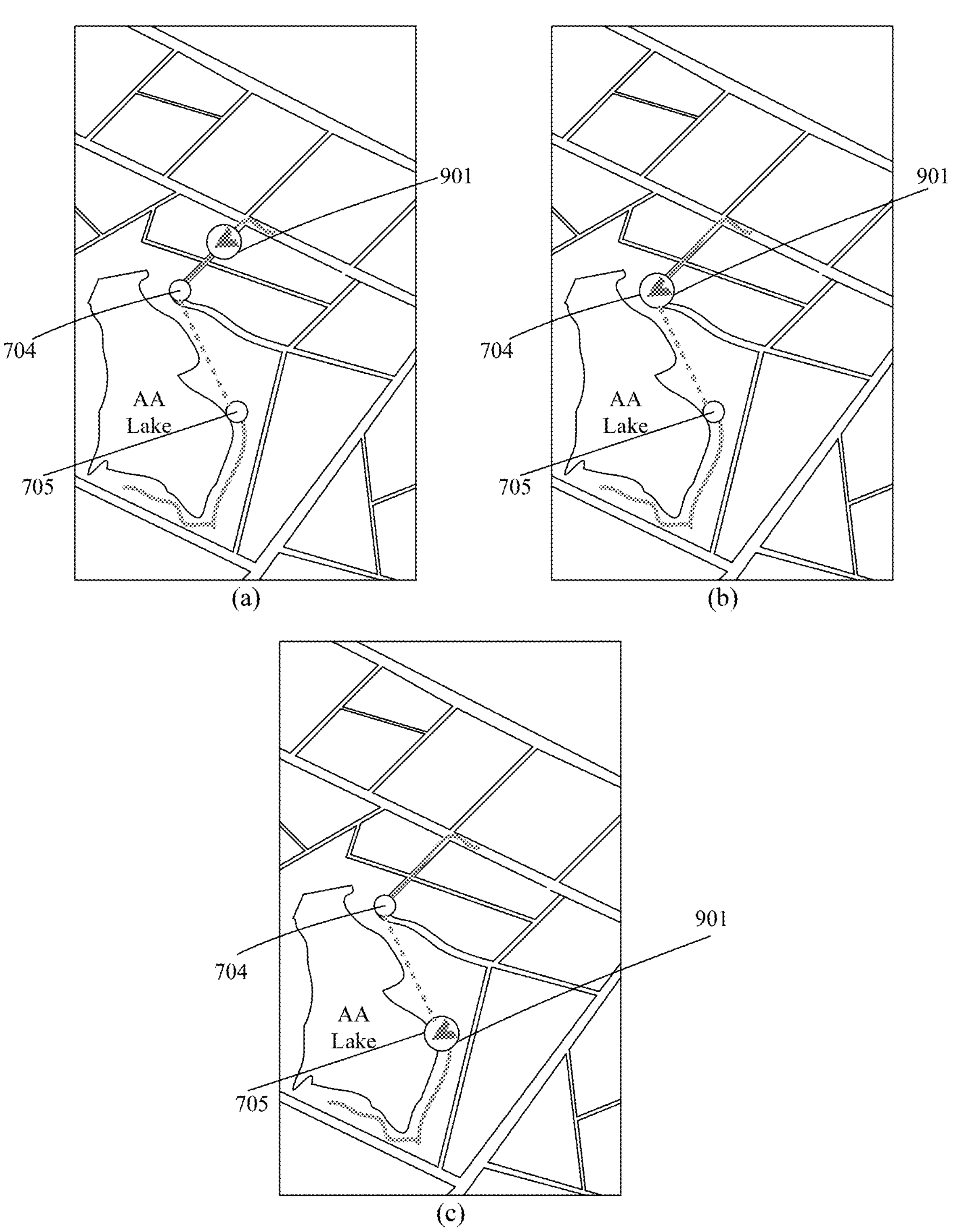
FIG. 9 is a schematic diagram showing an application scenario of segmented navigation consistent with the present disclosure.

FIG. 9 is a schematic diagram showing an application scenario of segmented navigation. The target navigation route in the application scenario shown in FIG. 9 may be determined according to the initial navigation route and the section to be erased shown in part (a) of FIG. 8.

As shown in part (a) of FIG. 9, when it is determined according to the user's position that the user is located in an unerased section, the electronic device may control the electronic device to perform route navigation, that is, the electronic device may navigate according to the route information in the unerased section. As shown in part (b) of FIG. 9, when it is determined according to the user's position 901 that the user arrives at the first endpoint 704 of the section to be erased, the electronic device may control the electronic device to perform direction navigation, that is, the electronic device may determine the direction of the second endpoint 705, and navigate according to the direction of the second endpoint 705 to instruct the user to move to the second endpoint 705.

In some embodiments, when it is determined according to the user's position 901 that the user arrives at the first endpoint 704 of the section to be erased, the electronic device may also obtain the distance between the user and the second endpoint 705, and may perform direction navigation according to the direction of the second endpoint 305 and the distance between the user and the second endpoint.

As shown in part (c) of FIG. 9, when it is determined that the user arrives at the second endpoint 705 of the section to be erased according to the user's position 901, the electronic device may control the electronic device to perform the route navigation. That is, when it is determined that the user has moved to the unerased section, the electronic device may continue to navigate according to the route information in the unerased section.

In one embodiment, after erasing the section to be erased, the user may adjust the initial navigation route after erasing the section to be erased by a supplementary section drawing operation. The electronic device may determine the target navigation route according to the user's supplementary section drawing operation.

For example, after erasing the section to be erased, the electronic device may receive the user's supplementary section drawing operation, and may determine the supplementary section and the starting point of the supplementary section according to the supplementary section drawing operation. Subsequently, the electronic device may determine the target navigation route according to the initial navigation route, the section to be erased, the supplementary section, and the starting point of the supplementary section.

In some embodiments, the user may draw the supplementary section by matching roads, freely drawing or connecting two points. After erasing the section to be erased, the electronic device may display a route drawing menu in the map interface, and the route drawing menu may include a "match running road" button, a "match cycling road," a "free draw" button, and a "connect two points" button, etc.

For example, when the user wishes to draw the supplementary section by matching running roads or matching cycling roads, the user may click the "match running roads" button or the "match cycling roads" button, and may enter the starting point and end point of the supplementary section through the supplementary section drawing operation. At this time, the electronic device may determine the supplementary section based on the starting point and end point of the supplementary section, as well as the road information. Further, the electronic device may determine the starting point of the supplementary section based on the supplementary section drawing operation.

The present disclosure does not have limit on the input method of the starting point and the end point of the supplementary section, that is, the operation of drawing the supplementary section is not limited. In some embodiments, the operation of drawing the supplementary section may be click operations. That is, the user may enter the starting point and the end point of the supplementary section by clicking on the position points in the map interface. For example, when a click operation on a position point in the map interface is detected, the electronic device may display a "Draw from the current point" button and an "Add destination" button in the map interface. The user may click the "Draw from the current point" button to enter the starting point of the supplementary section, or may click the "Add destination" button to enter the end point of the supplementary section.

For example, when the user wishes to determine the first end point of the section to be erased as the starting point of the supplementary section, and determine the second end point of the section to be erased as the end point of the supplementary section, after determining the section to be erased, the user may click the first end point of the section to be erased. At this time, the electronic device may display the "Draw from the current point" button and the "Add destination" button in the map interface. The user may click the "Draw from the current point" button. When the electronic device detects a click operation on the "Draw from current point" button, the first endpoint of the section to be erased may be determined as the starting point of the supplementary section. Subsequently, the user may continue to click the second endpoint of the section to be erased. Similarly, the electronic device may display the "Draw from the current point" button and the "Add destination" button in the map interface. The user may click the "Add destination" button. When the electronic device detects a click operation on the "Add destination" button, the second endpoint of the section to be erased may be determined as the end point of the supplementary section.

When a click operation on a certain position point in the map interface is detected, the electronic device may also display a "save position" button in the map interface such that the user may save the position point according to the "save position" button.

For example, when the user wishes to draw the supplementary section by free drawing, the user may click the "free draw" button and may perform a free drawing operation (i.e., a supplementary section drawing operation) in the map interface. At this time, the electronic device may determine the map trajectory corresponding to the free drawing operation according to the free drawing operation, and may determine the map trajectory corresponding to the free drawing operation as the supplementary section. Further, the electronic device may determine the starting point of the supplementary section according to the free drawing operation.

In one example, when the starting point of the supplementary section coincides with the first endpoint of the section to be erased, the electronic device may determine the first endpoint of the section to be erased as the starting point of the supplementary section. When the end point of the supplementary section coincides with the second endpoint of the section to be erased, the electronic device may determine the second endpoint of the section to be erased as the end point of the supplementary section. Similarly, when the starting point of the supplementary section coincides with the second end point of the section to be erased, the electronic device may determine the second end point of the section to be erased as the starting point of the supplementary section. When the end point of the supplementary section coincides with the first end point of the section to be erased, the electronic device may determine the first end point of the section to be erased as the end point of the supplementary section.

Whether the starting point of the supplementary section coincides with the first endpoint/second endpoint of the section to be erased may be determined based on the distance between the starting point of the supplementary section and the first endpoint or the second endpoint of the section to be erased. That is, the electronic device may obtain the distance between the starting point of the supplementary section and the first endpoint or the second endpoint of the section to be erased. When the distance between the starting point of the supplementary section and the first endpoint or the second endpoint is less than a first distance threshold, the electronic device may determine that the starting point of the supplementary section coincides with the first endpoint or the second endpoint. Similarly, whether the end point of the supplementary section coincides with the second endpoint or the first endpoint of the section to be erased may be determined based on the distance between the end point of the supplementary section and the second endpoint or the first endpoint of the section to be erased. That is, the electronic device may obtain the distance between the end point of the supplementary section and the second endpoint or the first endpoint of the section to be erased. When the distance between the end point of the supplementary section and the second endpoint or the first endpoint is less than the second distance threshold, the electronic device may determine that the end point of the supplementary section coincides with the second endpoint or the first endpoint. The distance described here may be a straight-line distance.

The first distance threshold and the second distance threshold may be specifically determined according to the actual scenario, and the embodiment of the present disclosure does not have limit on this. For example, when the user wishes to draw the supplementary section by "connecting two points," the user may click the "connect two points" button, and may input at least two position points corresponding to the supplementary section by the supplementary section drawing operation. At this time, the electronic device may connect the two adjacent position points in a straight line to obtain the map trajectory corresponding to the at least two position points, and may determine the map trajectory as the supplementary section. Further, the electronic device may determine the starting point of the supplementary section according to the supplementary section drawing operation.

The present disclosure has no limit on the input method of the at least two position points, that is, has no limit on the supplementary section drawing operation. For example, the supplementary section drawing operation may be click operations, that is, the user may input each of the at least two position points by clicking on the corresponding position point in the map interface. It may be understood that the specific content of inputting each of the at least two position points by clicking on the corresponding position point is similar to the content of inputting the starting point or end point of the supplementary section by clicking on the position points. The specific content may refer to the above description and will not be repeated here.

In one embodiment, after obtaining the supplementary section and the starting point of the supplementary section, the electronic device may determine the target navigation route according to the initial navigation route, the section to be erased, the supplementary section, and the starting point of the supplementary section, and may control the electronic device to perform navigation according to the target navigation route, that is, may perform route navigation and/or direction navigation according to the target navigation route. For example, when it is determined that the starting point of the supplementary section includes the first endpoint of the section to be erased and the end point of the supplementary section does not include the second endpoint of the section to be erased, for example, when the starting point of the supplementary section is the first endpoint of the section to be erased, or the supplementary section passes through the first endpoint of the section to be erased, and the end point of the supplementary section is not the second endpoint of the section to be erased, or the supplementary section does not pass through the second endpoint of the section to be erased, the electronic device may redetermine the end point of the supplementary section as the first endpoint, and may determine the target navigation route according to the section to be erased, the initial navigation route and the supplementary section redetermined by the first endpoint.

When the supplementary section also includes the second endpoint of the section to be erased, that is, when the supplementary section includes the first endpoint and the second endpoint of the section to be erased at the same time, that is, when the supplementary section connects the first endpoint and the second endpoint, the electronic device may determine the section between the first endpoint and the second endpoint in the supplementary section (for example, the section A) as the replacement section of the section to be erased. At this time, the electronic device may determine the route formed by the section A and the unerased section in the initial navigation route as the target navigation route, and may perform route navigation according to the target navigation route. That is, the target navigation route may be a continuous route, and the target navigation route may take the starting point of the unerased section (that is, the starting point of the initial navigation route) as the starting point and the end point of the unerased section (that is, the end point of the initial navigation route) as the end point. When the starting point of the supplementary section is the first endpoint of the section to be erased and the end point of the supplementary section is the second endpoint of the section to be erased, the electronic device may determine the supplementary section as the section A, that is, the electronic device may determine the route formed by the supplementary section and the unerased section in the initial navigation route as the target navigation route.

For example, when it is determined that the starting point of the supplementary section includes the second endpoint, and the end point of the supplementary section does not include the first endpoint, for example, when the starting point of the supplementary section is the second endpoint of the section to be erased or the supplementary section passes through the second endpoint of the section to be erased, and the end point of the supplementary section is not the first endpoint or the supplementary section does not pass through the second endpoint, the electronic device may redetermine the end point of the supplementary section as the second endpoint, and may determine the target navigation route based on the section to be erased, the initial navigation route and the supplementary section redetermined by the second endpoint.

When the supplementary section also includes the first endpoint of the section to be erased, the electronic device may determine the section between the first endpoint and the second endpoint in the supplementary section (for example, the section B) as a replacement section of the section to be erased. At this time, the electronic device may determine the route formed by the section B and the unerased section in the initial navigation route as the target navigation route, and may perform route navigation based on the target navigation route. When the starting point of the supplementary section is the second end point of the section to be erased, and the end point of the supplementary section is the first end point of the section to be erased, the electronic device may determine the supplementary section as the section B, that is, the electronic device may determine the route formed by the supplementary section and the unerased section in the initial navigation route as the target navigation route.

For example, when it is determined that the starting point of the supplementary section includes the starting point of the initial navigation route, for example, when the starting point of the supplementary section is the starting point of the initial navigation route or the supplementary section includes the starting point of the initial navigation route, the electronic device may determine the end point of the supplementary section as the starting point of the initial navigation route, and may determine the target navigation route based on the initial navigation route and the section to be erased that are re-determined from the starting point. Alternatively, when the starting point of the supplementary section includes the end point of the initial navigation route, for example, when it is determined that the starting point of the supplementary section is the end point of the initial navigation route or the supplementary section includes the end point of the initial navigation route, the electronic device may determine the end point of the supplementary section as the end point of the initial navigation route, and may determine the target navigation route based on the initial navigation route and the section to be erased that are re-determined from the end point.

That is, in the present embodiment, the user may redraw the section to be erased or a part of the section to be erased through the supplementary section drawing operation. Alternatively, the user may also extend the initial navigation route through the supplementary section drawing operation, for example, extend the initial navigation route from the starting position of the initial navigation route, or extend the initial navigation route from the end position of the initial navigation route.

Figure 10:
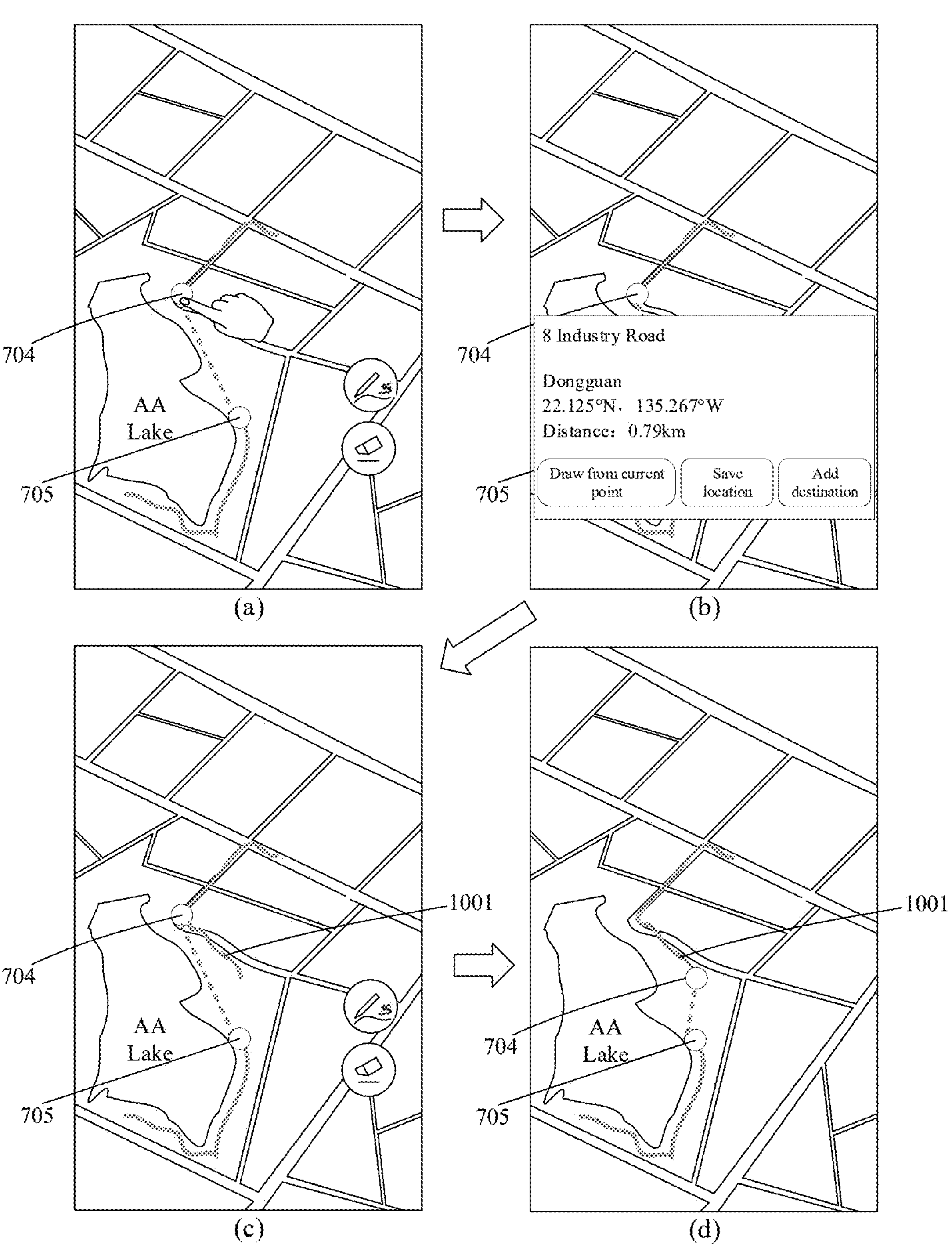
FIG. 10 and FIG. 11 are schematic diagrams showing application scenarios for determining a target navigation route consistent with the present disclosure.
Figure 11:
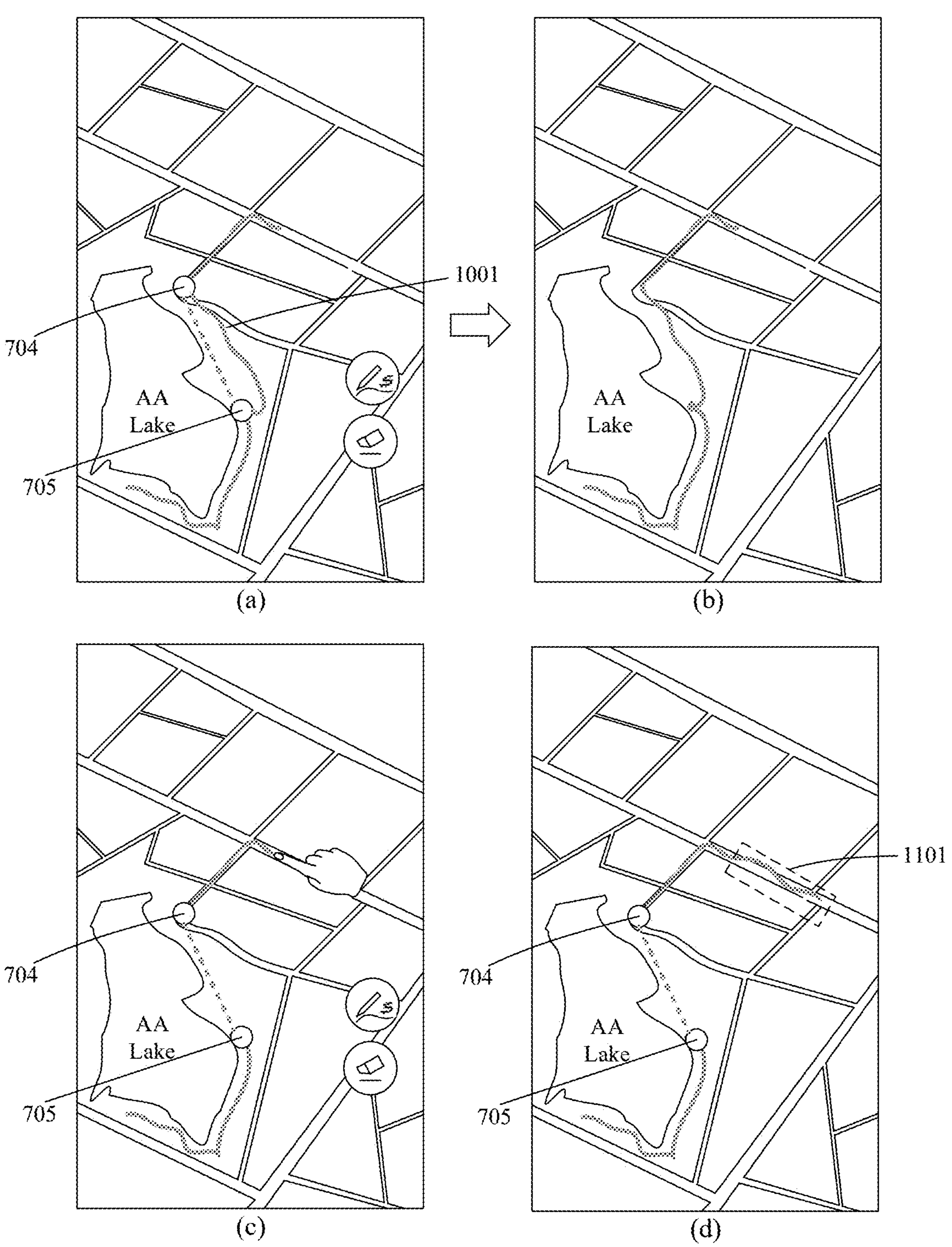

FIG. 10 and FIG. 11 are schematic diagrams showing application scenarios for determining the target navigation route. In this application scenario, the scenario shown in part (a) of FIG. 9 is used as an example for exemplary description. That is, the first endpoint of the section to be erased in this application scenario may be the first endpoint 704 shown in part (a) of FIG. 9, and the second endpoint may be the second endpoint 705 shown in part (a) of FIG. 9.

For example, after the section to be erased is erased, when the user wishes to redraw the section to be erased or a part of the section to be erased, the user may start drawing from the first endpoint 704 of the section to be erased, or start drawing from the second endpoint 705 of the section to be erased. When the user starts to freely draw the supplementary section from the first endpoint 704 of the section to be erased, the user may click the "free draw" button in the route drawing menu to start the free drawing function. Subsequently, as shown in part (a) of FIG. 10, the user may click the first endpoint 704 of the section to be erased. As shown in part (b) of FIG. 10, after the electronic device detects the click operation on the first endpoint 704, the position details of the first endpoint 704 may be displayed in the map interface, and a "draw from current point" button and an "add destination" button may be displayed. At this time, the user may click the "draw from current point" button and may start the free drawing operation from the first endpoint of the section to be erased. After the electronic device detects the free drawing operation in the map interface, the supplementary section and the end point of the supplementary section may be determined according to the free drawing operation.

As shown in part (b) of FIG. 10, after the electronic device detects the click operation on the first endpoint 704, it may also display a "save position" button in the map interface.

As shown in part (c) of FIG. 10, when the supplementary section 1001 does not include the second endpoint 705 of the section to be erased, the electronic device may redefine the end point of the supplementary section 1001 as the first endpoint 704 of the section to be erased. As shown in part (d) of FIG. 10, the electronic device may determine the target navigation route based on the supplementary section 1001, the redetermined section to be erased and the initial navigation route, and may control the electronic device to perform direction navigation based on the target navigation route. That is, when the user is located in the unerased section in the initial navigation route or the supplementary section 1001, the electronic device may perform route navigation based on the unerased section or the supplementary section 1001. When the user reaches the first endpoint 704 of the section to be erased (i.e., the end point of the supplementary section 1001), the electronic device may perform directional navigation based on the direction of the second endpoint 705 of the section to be erased. When the user reaches the second endpoint 705 of the section to be erased, that is, when the user reaches the unerased section, the electronic device may perform route navigation based on the unerased section.

As shown in part (a) of FIG. 11, when the supplementary section 1001 includes the second endpoint 705 of the section to be erased, the electronic device may determine the supplementary section 1001 as a replacement section of the section to be erased. At this time, as shown in part (b) of FIG. 11, the electronic device may determine the route formed by the supplementary section 1001 and the unerased section in the initial navigation route as the target navigation route, and may perform route navigation based on the target navigation route.

For example, when the user wishes to extend the initial navigation route, the user may start drawing from the starting point of the initial navigation route, or start drawing from the end point of the initial navigation route. When the user wishes to start free drawing of the supplementary section from the starting point of the initial navigation route, the user may click the "free draw" button in the route drawing menu. Subsequently, as shown in part (c) of FIG. 11, the user may click the starting point of the initial navigation route. At this time, the electronic device may display a "start drawing from current point" button and an "add destination" button in the map interface. The user may click the "start drawing from current point" button and may start free drawing operation from the starting point of the initial navigation route. As shown in part (d) of FIG. 11, after the electronic device detects the free drawing operation in the map interface, it may determine the supplementary section 11101 and the end point of the supplementary section 11101 according to the free drawing operation. Subsequently, the electronic device may redetermine the end point of the supplementary section 1101 as the starting point of the initial navigation route, that is, the supplementary section 11101 may be merged into the initial navigation route. Subsequently, the electronic device may determine the target navigation route according to the initial navigation route and the section to be erased, and navigate according to the target navigation route. That is, when the user is located in the supplementary section 1101 or the unerased section in the initial navigation route, the electronic device may perform route navigation according to the supplementary section 1101 or the unerased section. When the user reaches the first end point of the section to be erased, the electronic device may perform direction navigation according to the direction of the second end point of the section to be erased. When the user reaches the second end point of the section to be erased, that is, when the user reaches the unerased section, the electronic device may perform route navigation according to continuing the unerased section.

After determining the target navigation route, the electronic device may synchronize the target navigation route to other electronic devices such that other electronic devices may navigate according to the target navigation route, that is, other electronic devices may perform route navigation and/or direction navigation according to the target navigation route. For example, when the mobile phone and the smart watch are installed with the same navigation application, if the user performs operations such as route erasing and route drawing in the mobile phone, the mobile phone may determine the target navigation route according to the user's operation, and may synchronize the target navigation route to the smart watch through communication methods such as Bluetooth, or may synchronize the target navigation route to the smart watch through a server connected to the mobile phone and the smart watch. Therefore, the smart watch may navigate according to the target navigation route.

In the present disclosure, when navigation is needed, the electronic device may obtain the initial navigation route, and may receive the user's route erasing operation to erase the section to be erased according to the route erasing operation. The section to be erased may include at least a part of the initial navigation route corresponding to the route erasing operation. Subsequently, the electronic device may determine the target navigation route according to the initial navigation route and the section to be erased, and may control the electronic device to navigate according to the target navigation route. That is, the electronic device may erase a part of the initial navigation route according to the route erasing operation of the user, and may determine the target navigation route according to the initial navigation route and the erased part of the route, to control the electronic device to navigate according to the target navigation route. Therefore, the user may be able to flexibly adjust part of the initial navigation route through the route erasing operation, such that the final target navigation route meets the user's needs and improves the user experience.

The size of the sequence number of each step in the above embodiment does not mean the order of execution, and the execution order of each process should be determined by its function and internal logic, and should not constitute any limitation on the implementation process of the embodiments of the present disclosure.

Figure 12:
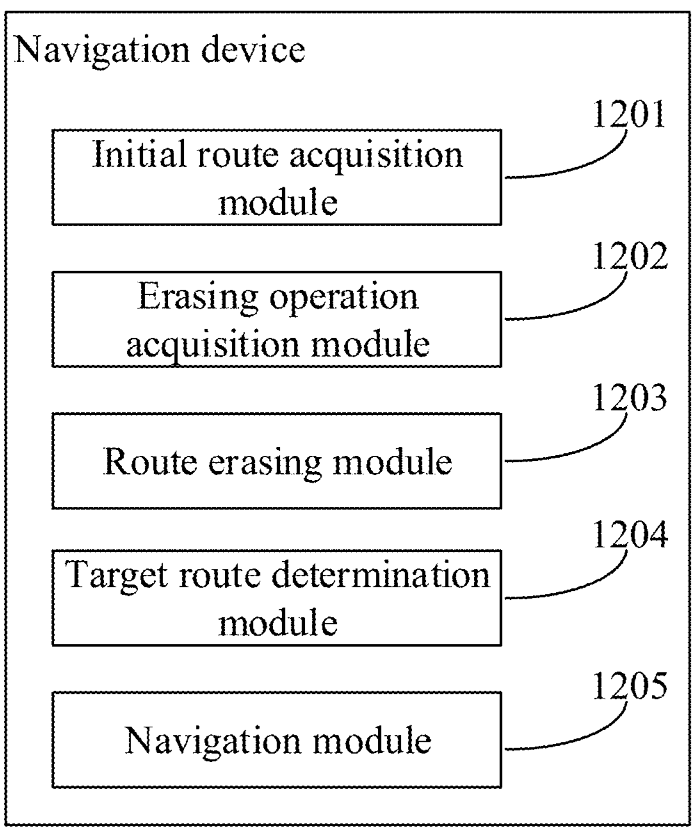
FIG. 12 is a schematic structural diagram of a navigation device consistent with the present disclosure.

The present disclosure also provides a navigation device corresponding to the above navigation method. As shown in FIG. 12 which is a structural diagram of an exemplary navigation device (for description purposes, only parts related to the present disclosure are shown in the drawings), in one embodiment, the navigation device includes:

- an initial route acquisition module 1201, configured to acquire an initial navigation route;
- an erasing operation acquisition module 1202, configured to receive a route erasing operation of a user;
- a route erasing module 1203, configured to erase a section to be erased according to the route erasing operation, where the section to be erased may include at least a part of the initial navigation route corresponding to the route erasing operation;
- a target route determination module 1204, configured to determine a target navigation route according to the initial navigation route and the section to be erased; and
- a navigation module 1205, configured to perform navigation according to the target navigation route.

The route erasing module 1203 may be further configured to: determine at least a part of the initial navigation route corresponding to the route erasing operation as the section to be erased; and control the electronic device to erase the section to be erased.

In one embodiment, the device may also include: a map area determination module, configured to determine a map area corresponding to the route erasing operation according to the route erasing operation.

The route erasing module 1203 may be further configured to: determine at least a part of the initial navigation route covered in the map area as the section to be erased.

In some embodiments, the route erasing module 1203 may be further configured to: determine the section to be erased from the multiple parts of the initial navigation route according to the route erasing operation when it is detected that the map area covers multiple parts of the initial navigation route.

The section to be erased may be closer to the starting point or the end point of the initial navigation route relative to other parts.

In another embodiment, the route erasing operation may be a sliding operation, and the section to be erased may be covered by the map area corresponding to the route erasing operation before/after the other parts, and the other parts may be the parts of the multiple parts of the initial navigation route except the section to be erased. That is, the section to be erased may be the earliest one or the latest one among the multiple parts of the initial navigation route that is covered by the map area corresponding to the route erasing operation.

In one embodiment, the device may also include a position acquisition module configured to acquire the position of the user. The navigation module 1205 may include a segmented navigation unit, configured to control the electronic device to perform segmented navigation according to the position of the user and the target navigation route.

In one embodiment, the segmented navigation unit may be further configured to control the electronic device to perform route navigation when it is determined based on the user's position that the user is located in the unerased section, where the unerased section is the part of the initial navigation route excluding the section to be erased.

In another embodiment, the section to be erased may include a first endpoint and a second endpoint, and the second endpoint is farther away from the starting point of the initial navigation route relative to the first endpoint.

The segmented navigation unit may be further configured to control the electronic device to perform directional navigation when it is determined based on the user's position that the user has arrived at the first endpoint of the section to be erased.

In another embodiment, the segmented navigation unit may be further configured to control the electronic device to perform route navigation when it is determined based on the user's position that the user has arrived at the second endpoint of the section to be erased.

In one embodiment, the navigation device may also include:

- a drawing operation acquisition module, configured to receive the user's supplementary section drawing operation; and
- a section drawing module, configured to determine the supplementary section and the starting point of the supplementary section according to the supplementary section drawing operation.

The target route determination module 1204 may be further configured to determine the target navigation route according to the initial navigation route, the section to be erased, the supplementary section, and the starting point of the supplementary section.

In one embodiment, the section to be erased may include a first endpoint and a second endpoint, and the second endpoint may be farther away from the starting point of the initial navigation route relative to the first endpoint.

The target route determination module 1204 may be further configured to: when it is determined that the starting point of the supplementary section includes the first endpoint, redetermine the end point of the supplementary section as the first endpoint; or, when it is determined that the starting point of the supplementary section includes the second endpoint, redetermine the end point of the supplementary section as the second endpoint; or, when it is determined that the starting point of the supplementary section includes the starting point of the initial navigation route, determine the end point of the supplementary section as the starting point of the initial navigation route; or, when it is determined that the starting point of the supplementary section includes the end point of the initial navigation route, determine the end point of the supplementary section as the end point of the initial navigation route.

In one embodiment, the section to be erased may include a first endpoint and a second endpoint, and the second endpoint may be farther from the starting point of the initial navigation route than the first endpoint.

The target route determination module 1204 may be further configured to: determine the second endpoint as the starting point of the initial navigation route when the section to be erased includes the starting point of the initial navigation route; or, when the section to be erased includes the end point of the initial navigation route, determine the first endpoint as the end point of the initial navigation route.

The information interaction, execution process, etc. between the above-mentioned devices/units are based on the same concept as the method embodiments of the present disclosure, and their specific functions and technical effects can be found in the method embodiment part, which will not be repeated here.

Those skilled in the art can clearly understand that for the convenience and simplicity of description, only the division of the above-mentioned functional units and modules is used as an example for illustration. In practical applications, the above-mentioned function allocation can be completed by different functional units and modules as needed, that is, the internal structure of the device can be divided into different functional units or modules to complete all or part of the functions described above. The functional units and modules in the embodiment can be integrated in a processing unit, or each unit can exist physically separately, or two or more units can be integrated in one unit. The above-mentioned integrated unit can be implemented in the form of hardware or in the form of software functional units. In addition, the specific names of the functional units and modules are only for the convenience of distinguishing each other, and are not used to limit the scope of the present disclosure. The specific working process of the units and modules in the above-mentioned system can refer to the corresponding process in the aforementioned method embodiments, which will not be repeated here.

Figure 13:
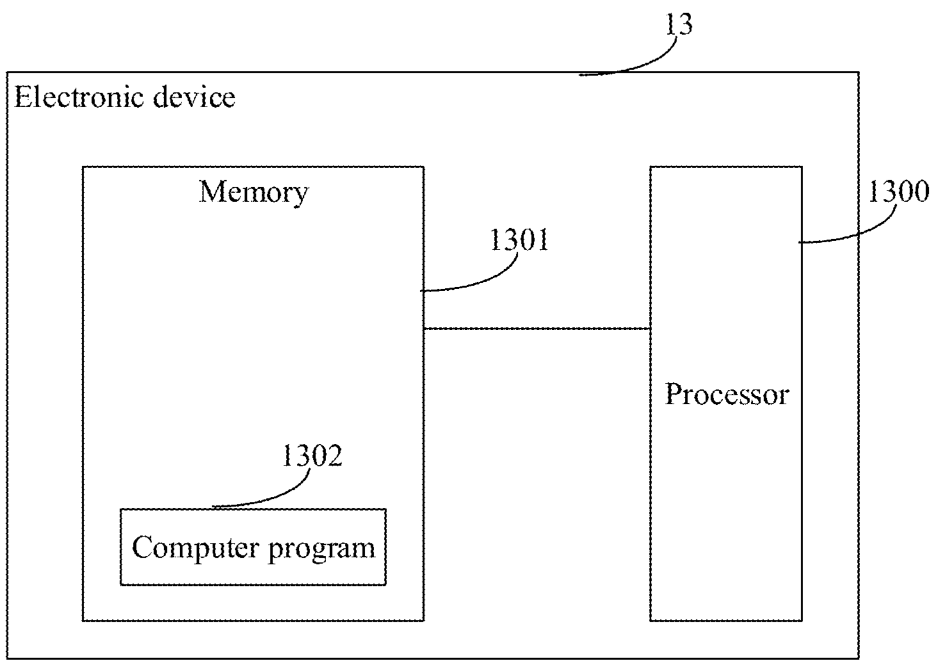
FIG. 13 is a schematic structural diagram of an electronic device consistent with the present disclosure.

The present disclosure also provides an electronic device. As shown in FIG. 13, in one embodiment, the electronic device 13 may include at least one processor 1300 (only one is shown in the drawings) and at least one memory 1310, with at least one computer program 1302 stored in the at least one memory 1301 and capable of being executed in the at least one processor 1300. The at least one processor 1300 may execute the at least one computer program 1302, to implement steps in any navigation method provided by various embodiments of the present disclosure.

In one embodiment, the electronic device 13 may include, but is not limited to, the at least one processor 1300 and the at least one memory 1301. The embodiment shown in FIG. 13 is only used as an example to illustrate the present disclosure, and does not limit the scope of the present disclosure. The electronic device may include more or fewer components than shown in the figure, or combine certain components, or different components, such as input and output devices, network access devices, etc.

In various embodiments, the processor may be a central processing unit (CPU), and may also be other general-purpose processors, digital signal processors (DSP), application-specific integrated circuits (ASIC), field-programmable gate arrays (FPGA) or other programmable logic devices, discrete gates or transistor logic devices, discrete hardware components, etc. The general-purpose processor may be a microprocessor or any conventional processor, etc.

In some embodiments, the memory 1301 can be an internal storage unit of the electronic device 13, such as a hard disk or memory of the terminal device. In some other embodiments, the memory 1301 can be an external storage device of the electronic device 13, for example, a plug-in hard disk, a smart media card (SMC), a secure digital (SD) card, a flash card, etc. equipped on the terminal device. The memory 1301 can also include both an internal storage unit of the electronic device 13 and an external storage device. The memory 1301 can be used to store an operating system, an application program, a boot loader, data, or other programs, such as program codes of a computer program. The memory 1301 can also be used to temporarily store data that has been output or is to be output.

The present disclosure also provides a computer readable storage medium. The computer readable storage medium may be configured to store a computer program. When the computer program is executed by a processor, the navigation method provided by various embodiments of the present disclosure may be implemented.

All or part of the processes in the methods provided by various embodiments of the present disclosure may be implemented by instructing the relevant hardware through a computer program. The computer program may be stored in a computer-readable storage medium. When the computer program is executed by a processor, the steps of each of the above-mentioned method embodiments may be implemented. The computer program may include computer program codes, and the computer program codes may be in a source code form, an object code form, an executable file or some intermediate forms. The computer-readable medium may at least include: any entity or device that is able to carry the computer program codes to the terminal device, a recording medium, a computer memory, a read-only memory (ROM), a random access memory (RAM), an electrical carrier signal, a telecommunication signal, or a software distribution medium such as, for example, a USB flash drive, a mobile hard disk, a disk or an optical disk.

Embodiments in this specification are described in a progressive manner, and each embodiment focuses on the difference from other embodiments. Same and similar parts of the embodiments may be referenced to by each other. As for the device disclosed in the embodiments, since it corresponds to the method disclosed in the embodiments, the description is relatively simple, and for relevant details, the reference may be made to the description of the method embodiments.

Devices and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

In the present disclosure, the drawings and descriptions of the embodiments are illustrative and not restrictive. The same drawing reference numerals identify the same structures throughout the description of the embodiments. In addition, figures may exaggerate the thickness of some layers, films, screens, areas, etc., for purposes of understanding and ease of description. It will also be understood that when an element such as a layer, film, region or substrate is referred to as being "on" another element, it may be directly on the another element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are only for the convenience of describing the present disclosure, rather than indicating or implying that the device or element referred to must have a specific orientation, be constructed and operated in a specific orientation, and therefore cannot be construed as a limitation of the present disclosure. When a component is said to be "connected" to another component, it may be directly connected to the other component or there may be an intermediate component present at the same time.

In this disclosure, relational terms such as "first" and "second" are only configured to distinguish one entity or operation from another entity or operation, and do not necessarily require or imply that there is such actual relationship or sequence between these entities or operations them. Furthermore, the terms "comprises," "includes," or any other variation thereof are intended to cover a non-exclusive inclusion, such that an article or device including a list of elements includes not only those elements, but also other elements not expressly listed. Or it also includes elements inherent to the article or equipment. Without further limitation, an element defined by the statement "comprises a . . . " does not exclude the presence of other identical elements in an article or device that includes the above-mentioned element.

The disclosed equipment and methods may be implemented in other ways. The device embodiments described above are only illustrative. For example, the division of the units is only a logical function division. In actual implementation, there may be other division methods, such as: multiple units or components may be combined, or can be integrated into another system, or some features can be ignored, or not implemented. In addition, the coupling, direct coupling, or communication connection between the components shown or discussed may be through some interfaces, and the indirect coupling or communication connection of the devices or units may be electrical, mechanical, or other forms.

The units described above as separate components may or may not be physically separated. The components shown as units may or may not be physical units. They may be located in one place or distributed to multiple network units. Some or all of the units may be selected according to actual needs to achieve the purpose of the solution of the present disclosure.

In addition, all functional units in the embodiments of the present disclosure may be integrated into one processing unit, or each unit may be separately used as a unit, or two or more units can be integrated into one unit. The above-mentioned integration units can be implemented in the form of hardware or in the form of hardware plus software functional units.

Various embodiments have been described to illustrate the operation principles and exemplary implementations. Those skilled in the art should understand that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A navigation method comprising:

obtaining an initial navigation route;

receiving a route erasing operation;

erasing a target section according to the route erasing operation, the target section including at least a part of the initial navigation route corresponding to the route erasing operation, the target section includes a first endpoint and a second endpoint, the second endpoint being farther away from a starting point of the initial navigation route than the first endpoint;

determining a supplementary section and a starting point of the supplementary section according to a supplementary section drawing operation;

determining a target navigation route according to the initial navigation route, the target section, the supplementary section, and the starting point of the supplementary section, including:

in response to determining that the starting point of the supplementary section includes the first endpoint, re-determining an end point of the supplementary section as the first endpoint;

in response to determining that the starting point of the supplementary section includes the second endpoint, re-determining the end point of the supplementary section as the second endpoint;

in response to determining that the starting point of the supplementary section includes the starting point of the initial navigation route, re-determining the end point of the supplementary section as the starting point of the initial navigation route; or in response to determining that the starting point of the supplementary section includes an end point of the initial navigation route, re-determining the end point of the supplementary section as the end point of the initial navigation route; and controlling an electronic device to perform navigation according to the target navigation route.

2. The method according to claim 1, wherein erasing the target section according to the route erasing operation includes:

determining the at least a part of the initial navigation route corresponding to the route erasing operation as the target section; and controlling the electronic device to erase the target section.

3. The method according to claim 2, further comprising:

determining a map area corresponding to the route erasing operation;

wherein determining the at least a part of the initial navigation route corresponding to the route erasing operation as the target section includes:

determining at least a part of the initial navigation route covered by the map area corresponding to the route erasing operation as the target section.

4. The method according to claim 3, wherein determining the at least a part of the initial navigation route covered by the map area corresponding to the route erasing operation as the target section includes:

in response to the map area covering a plurality of parts of the initial navigation route, determining the target section from the plurality of parts of the initial navigation route according to the route erasing operation.

5. The method according to claim 4, wherein the target section is closer to the starting point or an end point of the initial navigation route than one of the plurality of parts of the initial navigation route other than the target section.

6. The method according to claim 4, wherein:

the route erasing operation is a sliding operation; and the target section is one of the plurality of initial navigation route covered by the map area corresponding to the route erasing operation.

7. The method according to claim 1, further comprising:

obtaining a position of a user performing the erasing operation;

wherein controlling the electronic device to perform navigation according to the target navigation route includes controlling the electronic device to perform navigation according to the position of the user and the target navigation route.

8. The method according to claim 7, wherein controlling the electronic device to perform navigation according to the position of the user and the target navigation route includes:

in response to determining, according to the position of the user, that the user is located at an unerased section, controlling the electronic device to perform navigation according to route information of the unerased section, the unerased section being a part of the initial navigation route other than the target section.

9. The method according to claim 7, wherein:

controlling the electronic device to perform navigation based on the position of the user and the target navigation route includes:

in response to determining, according to the position of the user, that the user arrives at the first endpoint, controlling the electronic device to perform navigation based on a direction of the second endpoint.

10. The method according to claim 7, wherein:

controlling the electronic device to perform navigation based on the position of the user and the target navigation route includes:

in response to determining, according to the position of the user, that the user arrives at the second endpoint, controlling the electronic device to perform route navigation.

11. The method according to claim 1, further comprising: receiving the supplementary section drawing operation.

12. The method according to claim 1, further comprising:

in response to the target section including the starting point of the initial navigation route, re-determining the second endpoint as the starting point of the initial navigation route; or in response to the target section including the end point of the initial navigation route, re-determining the first endpoint as the end point of the initial navigation route.

13. An electronic device comprising:

at least one memory storing at least one computer program; and at least one processor configured to execute the at least one computer program to:

obtain an initial navigation route;

receive a route erasing operation;

erase a target section according to the route erasing operation, the target section including at least a part of the initial navigation route corresponding to the route erasing operation, the target section includes a first endpoint and a second endpoint, the second endpoint being farther away from a starting point of the initial navigation route than the first endpoint;

determine a supplementary section and a starting point of the supplementary section according to a supplementary section drawing operation;

determine a target navigation route according to the initial navigation route, the target section, the supplementary section, and the starting point of the supplementary section, including:

in response to determining that the starting point of the supplementary section includes the first endpoint, re-determining an end point of the supplementary section as the first endpoint;

in response to determining that the starting point of the supplementary section includes the second endpoint, re-determining the end point of the supplementary section as the second endpoint;

in response to determining that the starting point of the supplementary section includes the starting point of the initial navigation route, re-determining the end point of the supplementary section as the starting point of the initial navigation route; or in response to determining that the starting point of the supplementary section includes an end point of the initial navigation route, re-determining the end point of the supplementary section as the end point of the initial navigation route; and control the electronic device to perform navigation according to the target navigation route.

14. The electronic device according to claim 13, wherein the at least one processor is further configured to execute the at least one computer program to:

determine the at least a part of the initial navigation route corresponding to the route erasing operation as the target section; and control the electronic device to erase the target section.

15. The electronic device according to claim 14, wherein:

the at least one processor is further configured to execute the at least one computer program to:

determine a map area corresponding to the route erasing operation; and wherein determining the at least a part of the initial navigation route corresponding to the route erasing operation as the target section includes:

determining at least a part of the initial navigation route covered by the map area corresponding to the route erasing operation as the target section.

16. The electronic device according to claim 15, wherein the at least one processor is further configured to execute the at least one computer program to:

in response to the map area covering a plurality of parts of the initial navigation route, determine the target section from the plurality of parts of the initial navigation route according to the route erasing operation.

17. The electronic device according to claim 16, wherein the target section is closer to the starting point or an end point of the initial navigation route than one of the plurality of parts of the initial navigation route other than the target section.

18. The electronic device according to claim 16, wherein:

the route erasing operation is a sliding operation; and the target section is one of the plurality of initial navigation route covered by the map area corresponding to the route erasing operation.

19. A non-transitory computer readable storage medium storing at least one computer program that, when executed by at least one processor, causes the at least one processor to perform the method according to claim 1.

20. A navigation method comprising:

obtaining an initial navigation route;

receiving a route erasing operation;

erasing a target section according to the route erasing operation, the target section including at least a part of the initial navigation route corresponding to the route erasing operation, the target section includes a first endpoint and a second endpoint, the second endpoint being farther away from a starting point of the initial navigation route than the first endpoint;

receiving a supplementary section drawing operation;

determining a supplementary section and a starting point of the supplementary section according to the supplementary section drawing operation;

determining a target navigation route according to the initial navigation route, the target section, the supplementary section, and the starting point of the supplementary section, including:

in response to determining that the starting point of the supplementary section includes the first endpoint, re-determining an end point of the supplementary section as the first endpoint;

in response to determining that the starting point of the supplementary section includes the second endpoint, re-determining the end point of the supplementary section as the second endpoint;

in response to determining that the starting point of the supplementary section includes the starting point of the initial navigation route, re-determining the end point of the supplementary section as the starting point of the initial navigation route; or in response to determining that the starting point of the supplementary section includes an end point of the initial navigation route, re-determining the end point of the supplementary section as the end point of the initial navigation route; and controlling an electronic device to perform navigation according to the target navigation route.

* * * * *